United States Patent
Kirk et al.

(10) Patent No.: US 10,346,756 B2
(45) Date of Patent: Jul. 9, 2019

(54) MACHINE DISCOVERY AND RAPID AGGLOMERATION OF SIMILAR STATES

(71) Applicant: CenturyLink Intellectual Property LLC, Denver, CO (US)

(72) Inventors: Ryan Kirk, Seattle, WA (US); Victor Sletten, Bellevue, WA (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 79 days.

(21) Appl. No.: 15/838,098

(22) Filed: Dec. 11, 2017

(65) Prior Publication Data

US 2018/0211172 A1    Jul. 26, 2018

Related U.S. Application Data

(60) Provisional application No. 62/450,493, filed on Jan. 25, 2017.

(51) Int. Cl.
*G06F 15/18* (2006.01)
*G06N 5/04* (2006.01)
*H04L 29/08* (2006.01)

(52) U.S. Cl.
CPC .............. *G06N 5/045* (2013.01); *H04L 67/10* (2013.01); *H04L 67/22* (2013.01)

(58) Field of Classification Search
CPC ....................................................... G06F 16/00
USPC ..................................................... 706/15, 45
See application file for complete search history.

(56) References Cited

U.S. PATENT DOCUMENTS

| | | |
|---|---|---|
| 8,639,797 B1 | 1/2014 | Pan et al. |
| 9,509,710 B1 | 11/2016 | Barry |
| 9,516,035 B1 | 12/2016 | Moritz |
| 2010/0290346 A1 | 11/2010 | Barford et al. |
| 2013/0117676 A1 | 5/2013 | de Pauw et al. |
| 2013/0132385 A1 | 5/2013 | Bullotta |
| 2018/0211171 A1 | 7/2018 | Kirk |

FOREIGN PATENT DOCUMENTS

| | | |
|---|---|---|
| EP | 1522020 | 12/2015 |
| WO | WO-2015-017314 | 2/2015 |
| WO | WO-2015-077917 | 6/2015 |

OTHER PUBLICATIONS

International Search Report and Written Opinion of the International Searching Authority, PCT/US2018/015154, dated May 2, 2018, 16 pages.

(Continued)

*Primary Examiner* — David R Vincent

(57) ABSTRACT

Novel tools and techniques for the machine discovery and rapid agglomeration of similar states are provided. A system includes a plurality of network devices, and a decision system. The plurality of network devices may be configured to generate a respective data stream. The decision system may include a processor and a non-transitory computer readable medium including instructions executable by the processor. The system may obtain, via the plurality of network devices, one or more data streams, determine an anomaly has occurred on a data stream of the one or more data streams, determine a set of data streams of the one or more streams sharing at least one of a set of centroids associated with the data stream, and determine, based on the set of data streams, the occurrence of an incident.

17 Claims, 9 Drawing Sheets

(56) References Cited

OTHER PUBLICATIONS

Vanderkam et al. (Jan. 2017) "Nearest Neighbor Search in Google Correlate," available website: www.google.com/trends/correlate/nnsearch.pdf;accessed on Jan. 25, 2017, 8pgs.

International Search Report and Written Opinion of the International Searching Authority, dated May 8, 2018, PCT/US2018/015158 15 pages.

Rebbapragada, Umaa, et al., "Finding anomalous periodic time series: An application to catalogs of periodic variable stars", Machine Learn, Mar. 2009, 33 pages.

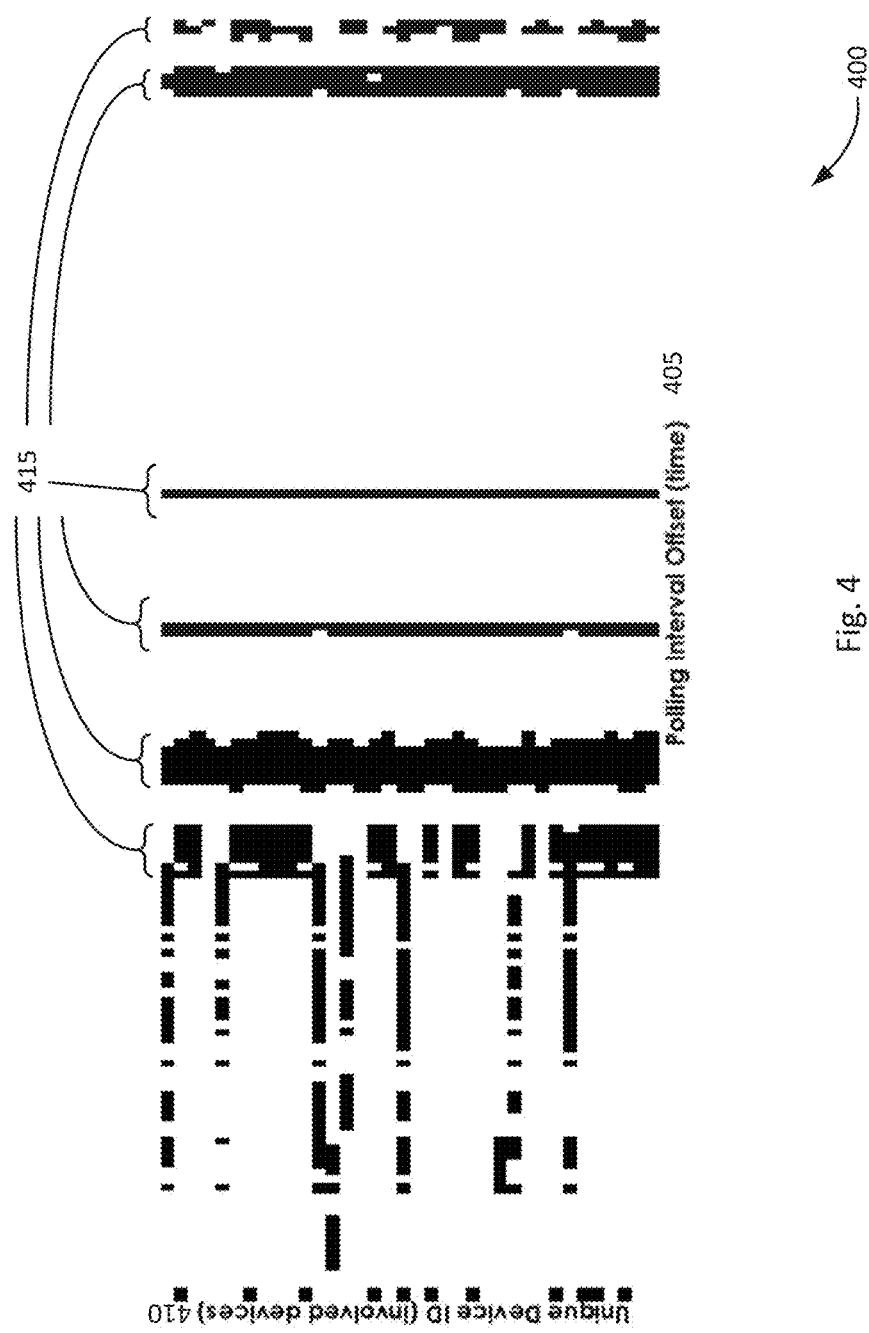

MACHINE DISCOVERY AND RAPID AGGLOMERATION OF SIMILAR STATES

CROSS REFERENCE TO RELATED APPLICATIONS

This application claims priority to U.S. Provisional Patent Application Ser. No. 62/450,493 filed Jan. 25, 2017 by Ryan Kirk et al., entitled "Machine Discovery and Rapid Agglomeration of Similar States." This application may also be related to U.S. Provisional Patent Application Ser. No. 62/450,490 filed Jan. 25, 2017 by Ryan Kirk et al., entitled "Machine Discovery of Aberrant Operating States." The disclosures of these applications are incorporated herein by reference in their entireties for all purposes

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to cloud computing technology, and more particularly to predictive tools and techniques for machine driven discovery and agglomeration of similar states in real-time.

BACKGROUND

Increasingly, organizations and individuals are increasingly moving to cloud-based platforms. The cloud is a massive, complex, and globally interconnected computer system. For the service providers hosting the cloud-platforms, the various network, storage, and computing resources are challenging to manage due to both the scale and heterogeneity of the various types of devices, hardware, software, and other cloud resources.

Internal maintenance, customer demands, and bad actors pose threats to the stability of cloud platforms. Because the cloud is a shared, public computing platform, actions affecting one customer often affect other neighboring customers. Often, service providers use approaches that rely on heavy computational loads, and human-review and input to mitigate instability in their platforms.

Accordingly, tools and techniques are provided for machine driven, real-time discovery and agglomeration of similar states.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 4 is a schematic illustration of a failure pattern and anomaly alignment across multiple devices, in accordance with various embodiments;

DETAILED DESCRIPTION OF CERTAIN EMBODIMENTS

Figure 1:
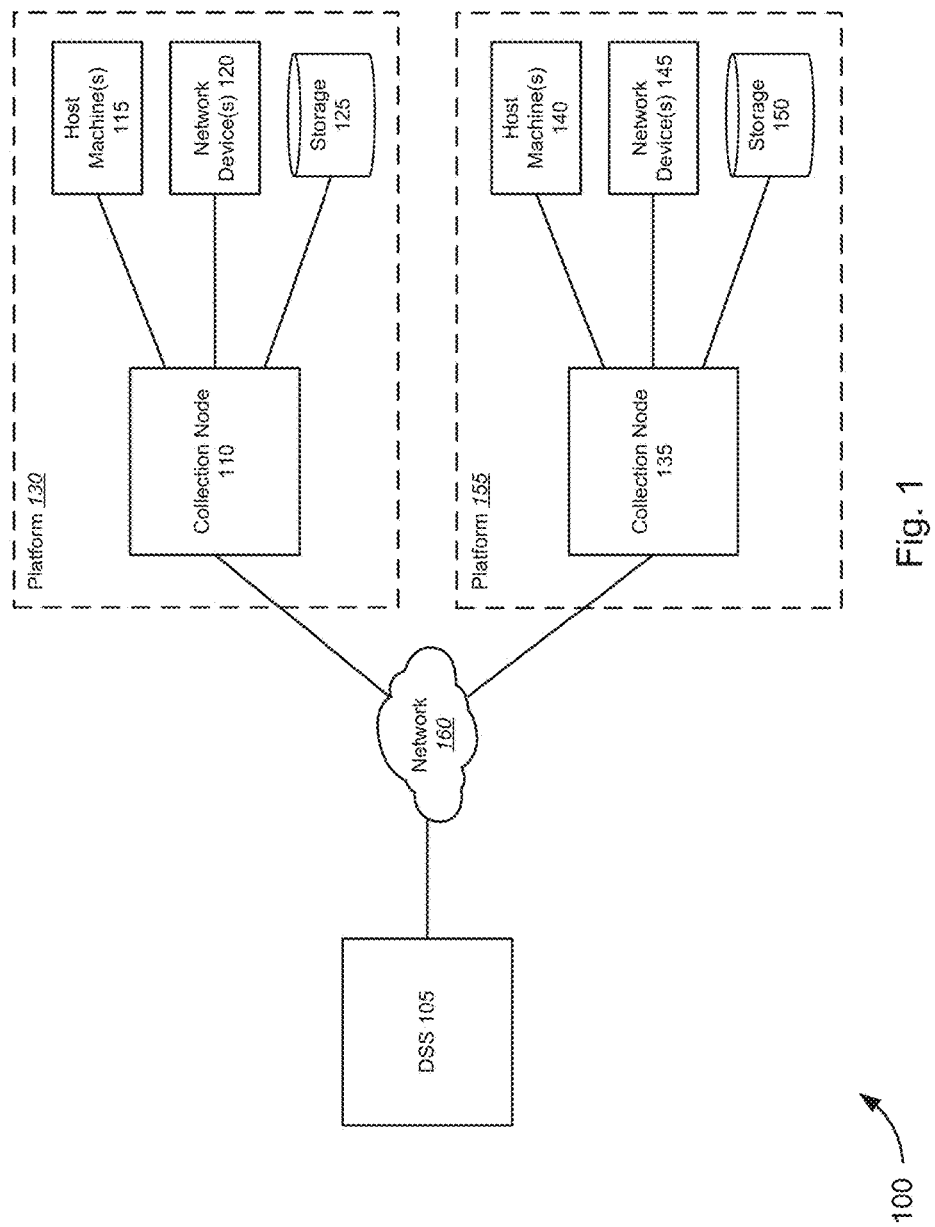
FIG. 1 is a schematic block diagram of a system for the machine discovery and rapid agglomeration of similar states, in accordance with various embodiments.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer read*able media (such as, to name but a few examples, optical media, magnetic media, and/or the like).

In an aspect, a system for the machine discovery and rapid agglomeration of similar states is provided. The system may include a plurality of network devices and a decision system. The plurality of network devices may be associated with a cloud platform. Each network device of the plurality of network devices may be configured to generate a respective data stream in real-time. Each data stream may include a sequence of data points indicative of a value of a performance metric at an associated time. The decision system may be in communication with the plurality of network devices. The decision system may include a processor, and a non-transitory computer readable medium comprising instructions executable by the processor to perform various functions. The decision system may obtain, via the plurality of network devices, one or more data streams, each of the one or more data streams comprising real-time time-series data indicative of a network activity generated by a respective network device. The decision system may further determine an anomaly has occurred on a data stream of the one or more data streams. The decision system may determine, responsive to the determination that an anomaly has occurred, a set of data streams of the one or more streams sharing at least one of a set of centroids associated with the data stream. Then, the decisions system may determine, based on the set of data streams, the occurrence of an incident in the cloud platform.

In another aspect, an apparatus for the machine discovery and rapid agglomeration of similar states is provided. The apparatus may include a processor, and a non-transitory computer readable medium comprising instructions executable by the processor to perform various functions. The apparatus may be configured to obtain, via the plurality of network devices, one or more data streams, each of the one or more data streams comprising real-time time-series data indicative of a network activity generated by a respective network device. The apparatus may further determine an anomaly has occurred on a data stream of the one or more data streams. The apparatus may determine, responsive to the determination that an anomaly has occurred, a set of data streams of the one or more streams sharing at least one of a set of centroids associated with the data stream. Then, the apparatus may determine, based on the set of data streams, the occurrence of an incident in the cloud platform.

In a further aspect, a method for the machine discovery and rapid agglomeration of similar states is provided. The method may include obtaining, via a decision support system, via the plurality of network devices, one or more data streams, each of the one or more data streams comprising real-time time-series data indicative of a network activity generated by a respective network device. The method may continue by determining, via the decision support system, an anomaly has occurred on a data stream of the one or more data streams. The method may include determining, via the decision support system, responsive to the determination that an anomaly has occurred, a set of data streams of the one or more streams sharing at least one of a set of centroids associated with the data stream. The method continues by determining, via the decision support system, based on the set of data streams, the occurrence of an incident. The method may proceed by performing, via the decision support system, a remedial action based on one of a type of the incident, the data stream, or the set of data streams.

Various modifications and additions can be made to the embodiments discussed without departing from the scope of the invention. For example, while the embodiments described above refer to specific features, the scope of this invention also includes embodiments having different combination of features and embodiments that do not include all the above described features.

FIG. 1 is a schematic block diagram of a system 100 for the machine discovery and rapid agglomeration of similar states. According to various embodiments, the system 100 includes various cloud resources and a centralized analytics platform. For example, the system 100 includes a decision support system (DSS) 105, a first platform 130 including a first collection node 110, one or more first host machines 115, one or more first network devices 120, and one or more first storage devices 125, a second platform 155 including a second collection node 135, one or more second host machines 140, one or more second network devices 145, and one or more second storage devices 150, and network 160. It should be noted that the components of the system 100 are schematically illustrated in FIG. 1, and that a variety of hardware configurations are possible in accordance with various embodiments.

In various embodiments, the first platform 130 may include a one or more first host machines 115, one or more first network devices 120, and one or more first storage devices 125. Each of the one or more first host machines 115, one or more first network devices 120, and one or more first storage devices 125 may be coupled to the first collection node 110. In some embodiments, the one or more first host machines 115, one or more first network devices 120, and one or more first storage devices 125 may further be coupled to one another. The first connection node 110 may, in turn, be coupled to the DSS 105 via the network 160. Similarly, the second platform 155 may include a one or more second host machines 140, one or more second network devices 145, and one or more second storage devices 150. Each of the one or more second host machines 140, one or more second network devices 145, and one or more second storage devices 150 may be coupled to the second collection node 135. In some embodiments, the one or more second host machines 140, one or more second network devices 145, and one or more second storage devices 150 may further be coupled to one another. The second connection node 135 may, in turn, be coupled to the DSS 105 via the network 160.

In various embodiments, the first platform 130 may refer to a first cloud-based platform and include various cloud resources needed to support the first platform 130. The assignment of various cloud resources to a platform, such as the first platform 130, may be determined based on variety of factors and categorizations. For example, the first platform 130 may include, without limitation, cloud resources utilized to support a specific cloud-based application or service, a group of applications or services, a customer, a group of customers, geographic areas, a specific data center, a group of data centers, one or more types of cloud resources, or alternatively, the platform may encompass all cloud resources available from a cloud service provider.

Accordingly, as illustrated in FIG. 1, the first platform 130 may include various cloud resources associated with the first platform 130, which may be a sub-platform of the overall cloud platform of the service provider. The cloud resources of the first platform 130 includes one or more first host machines 115, one or more first network devices 120, and one or more first storage devices 125. Cloud resources may refer to various types of network-based resources comprising a cloud platform. In some embodiments, the cloud resources may include resources connected via an external network. In further embodiments, cloud resources may include resources associated with a local, internal, or private network in which the various cloud resources be connected without an external network connection. For example, cloud resources associated with a first platform may include a plurality of virtual devices hosted by one or more host machines 115, which may in turn be connected locally at the host machine. Accordingly, cloud resources may refer to, without limitation, various network, storage, and compute resources accessible via the cloud. For example, network resources may refer to, without limitation, various network infrastructure, devices (e.g., gateways, modems, routers, switches, and physical transmission media), interfaces, and software for facilitating network communications. Storage resources may refer to, without limitation, various storage devices, such as databases, supporting the needs of an associated platform. Compute resources may refer to, without limitation, various computing devices of a cloud platform, such as servers and computers (both physical and virtual), hardware, and software. It is to be understood that in some embodiments, certain devices, hardware and/or software may be considered a combination of network, storage, and compute resources, and need not be considered a single type of cloud resource.

In various embodiments, the one or more first host machine(s) 115 may include various types of computer systems hosting various services, applications, and hardware and software resources associated with the first platform 130. Thus, the one or more first host machine(s) 115 may be configured to provide various cloud resources including, without limitation, compute resources. In some embodiments, the one or more first host machine(s) 115 may include both physical and virtual machines. The one or more first host machine(s) 115 may include, without limitations, various types of servers, and other computer systems. Accordingly, depending on the specifics of the first platform 130, the one or more first host machine(s) 115 may be a plurality of separate physical machines, part of a physical machine, a plurality of virtual machines, or a single virtual machine. The one or more first host machine(s) 115 may include physical and/or virtual hardware, and be configured to host one or more platform specific services or applications. For example, the first platform 130 may be associated with a first customer of the cloud service provider. Accordingly, the one or more first host machine(s) 115 may include all various servers and computer systems, both physical and virtual, supporting the services and applications associated with the first customer. In some embodiments, the one or more first host machine(s) 115 may overlap with other platforms. For example, a specific host machine of the one or more first host machine(s) 115 may belong to one or more different platforms, including the first platform 130, second platform 155, or both.

The one or more first network device(s) 120 may include, without limitation, gateways, routers, switches, and other network devices used to provision the various services and applications, and facilitate the operation of the services and applications associated with the first platform 130. The one or more first network device(s) 120 may include hardware, software, or both hardware and software resources. In various embodiments, the one or more first network device(s) 120 may be configured to provide various cloud resources, including, without limitation, network resources associated with the first platform 130.

The one or more first storage device(s) 125 may include, without limitation, various storage devices, such as, without limitation, databases, network drives, and other cloud storage solutions. The one or more first storage device(s) 125 may include several types of computer readable storage media, including, without limitation, microchips, integrated circuits (IC), flash drives and other solid-state devices, magnetic disk drives, optical discs (e.g., compact discs, digital video discs, and Blu-ray discs), and both volatile and non-volatile media. The one or more first storage device(s) 125 may be configured to provide various storage resources utilized by, or otherwise associated with the first platform 130.

In various embodiments, each of the one or more first host machine(s) 115, one or more first network device(s) 120, and one or more first storage device(s) 125 may be configured to generate a data stream in real-time. Data streams may include health and performance metrics (collectively referred to as performance metrics), and other measures of network activity. Accordingly, the data stream may include various metrics indicative performance, health, or other characteristics of a device or connection, as known to those in the art. The performance metrics, for example, may be indicative of network activity generated by a specific host machine of the one or more first host machine(s) 115, a specific network device of the one or more first network device(s) 120, or a storage device of the one or more first storage device(s) 125. In some embodiments, the performance metrics may include usage data, such as central processing unit (CPU) load, memory load, storage capacity, and other system specific performance metrics. In further embodiments, the performance metrics may further include measures of network performance including delay, jitter, packet loss, signal-to-noise ratio (SNR), latency, bandwidth, and other metrics.

In various embodiments, the data stream may include a plurality of observations, in which individual observations may be generated continuously, periodically, or on-demand (e.g., upon polling). Each of the one or more first host machine(s) 115, one or more first network device(s) 120, or one or more first storage device(s) 125 may be instrumented to monitor and generate the performance metrics. The data streams may further be generated relying on various techniques or combinations of techniques. For example, in some embodiments, the data streams may be generated via active polling (e.g., SNMP-based polling), passive receiving (e.g., SNMP messages, alerts, and other data).

In various embodiments, each unique data stream may be associated with a respective device and all its sub-interfaces. Accordingly, using the techniques described above, in one example implementation, a data lake may be built that contains signals from roughly one million unique data streams. The data lake of the example implementation grows at a rate of around 700 million records per day. Accordingly, as a cloud platform of a cloud service provider may include millions of unique devices, many different types of devices from different vendors, the data lake is a large collection of heterogenous data. For example, the same performance metric may be reported differently from two different devices. Thus, the heterogeneity of data in the data lake is a source of complexity. Furthermore, data for each respective data stream may be generated at different rates. Accordingly, an overall polling rate may be established with a granularity sufficient to measure variance across devices. In one example, a polling interval as low as 30 seconds may be established, with more than 80% of devices in the cloud platform 130, 155 having a polling cycle of 5 minutes.

In various embodiments, the first collection node 110 may be configured to monitor and collect all data associated with the first platform 130. For example, in some embodiments, the first platform 130 may include all devices associated with a data center. Accordingly, the first collection node 110 may be a centralized analytics environment deployed within the data center, and configured to collect all data streams associated with the devices located within the data center. Thus, in various embodiments, the first collection node 110 may be a monitoring system or managing system associated with the first platform 130, such as a data center. Accordingly, the first collection node 110, may be configured to actively poll and passively receive data stream data from each of the one or more first host machine(s) 115, one or more first network device(s) 120, and one or more first storage device(s) 125, as previously described.

In some embodiments, an alternative configuration may be utilized. The first platform 130 may be a cloud platform associated with a specific customer and associated cloud resources. Accordingly, the first collection node 110 may include one or more "canaries," that may be deployed across various data centers or in communication with the one or more first host machine(s) 115, one or more first network device(s) 120, and one or more first storage device(s) 125 of the first platform 130. The canaries may act as customer proxies, configured to collect data streams from the one or more first host machine(s) 115, one or more first network device(s) 120, and one or more first storage device(s) 125, to collect data streams specific to the customer associated with the first platform 130. Accordingly, canaries may include various monitoring systems and/or instrumentation configured to collect data streams of performance metrics associated with a specific platform, such as the first platform 130.

Similar to the first platform 130, the second platform 155 includes various cloud resources associated with the second platform 155, which may be a sub-platform of the overall cloud platform of the service provider. The second platform 155 includes one or more second host machines 140, one or more second network devices 145, and one or more second storage devices 150. In various embodiments, the one or more second host machine(s) 140 may include various types of computer systems hosting various services, applications, and hardware and software resources associated with the second platform 155. Thus, the one or more second host machine(s) 140 may be configured to provide various cloud resources including, without limitation, compute resources. In some embodiments, the one or more second host machine(s) 140 may include both physical and virtual machines. The one or more second host machine(s) 140 may include, without limitations, various types of servers, and other computer systems. Accordingly, depending on the specifics of the second platform 155, the one or more second host machine(s) 140 may be a plurality of separate physical machines, part of a physical machine, a plurality of virtual machines, or a single virtual machine. The one or more second host machine(s) 140 may include physical and/or virtual hardware, and be configured to host one or more platform specific services or applications. For example, the second platform 155 may be associated with a second customer of the cloud service provider. Accordingly, the one or more second host machine(s) 140 may include all various servers and computer systems, both physical and virtual, supporting the services and applications associated with the second customer. In some embodiments, the one or more second host machine(s) 140 may overlap with other platforms. For example, a specific host machine of the one or more second host machine(s) 140 may belong to one or more different platforms, including the first platform 130, second platform 155, or both.

The one or more second network device(s) 145 may include, without limitation, gateways, routers, switches, and other network devices used to provision the various services and applications, and facilitate the operation of the services and applications associated with the second platform 155. Like the one or more first network device(s) 120, the one or more second network device(s) 145 may include hardware, software, or both hardware and software resources associated with the second platform 155. The one or more second storage device(s) 145 may include, without limitation, various storage devices, such as, without limitation, databases, network drives, and other cloud storage solutions. The one or more second storage device(s) 150 may include several types of computer readable storage media and storage devices, such as databases. The one or more second storage device(s) 150 may be configured to provide various storage resources utilized by, or otherwise associated with the second platform 155.

Like in the first platform 130, in various embodiments, each of the one or more second host machine(s) 140, one or more second network device(s) 145, and one or more second storage device(s) 150 may be configured to generate a data stream in real-time. As previously described with respect to the first platform, in various embodiments, the data stream may be generated continuously, periodically, or on-demand (e.g., upon polling). Each of the one or more second host machine(s) 140, one or more second network device(s) 145, or one or more second storage device(s) 150 may be instrumented to monitor and generate the performance metrics. The data streams may be generated relying on various techniques or combinations of techniques. For example, as previously described, in some embodiments, the data streams may be generated via active polling (e.g., simple network management protocol (SNMP) based polling), passive receiving (e.g., SNMP messages, alerts, and other data).

In various embodiments, the second collection node 135 may be configured to monitor and collect all data associated with the second platform 155. For example, in some embodiments, the second platform 155 may include all devices associated with a respective data center. Accordingly, the second collection node 135 may be a centralized analytics environment deployed within the data center, and configured to collect all data streams associated with the devices located within the respective data center. Thus, in various embodiments, the second collection node 135 may be a monitoring system or managing system associated with the second platform 155. In an alternative embodiment, the second platform 155 may be a cloud platform associated with a respective customer and associated cloud resources. Accordingly, the second collection node 135 may include one or more canaries, that may be deployed across various data centers or in communication with the one or more second host machine(s) 140, one or more second network device(s) 145, and one or more second storage device(s) 150 of the second platform 155. Accordingly, the canaries may include various monitoring systems and/or instrumentation configured to collect data streams of performance metrics associated the second platform 155.

In various embodiments, each of the first collection node 110 and second collection node 135 may be coupled to a DSS 105 via network 160. Thus, within each of the first platform 130 and second platform 155, the first and second collection nodes 110, 135 may, respectively, control the collection process for collecting data streams. The first and second collection nodes 110, 135 may then be configured to provide the data streams to a centralized analytics system, such as the DSS 105, via the network 160. For example, network 160 may include various types of communications networks, including, without limitation, a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an IR network; a wireless network, including, without limitation, a network operating under any of the IEEE 802.11 suite of protocols, the Bluetooth™ protocol known in the art, the Z-Wave protocol known in the art, the ZigBee protocol or other IEEE 802.15.4 suite of protocols known in the art, and/or any other wireless protocol; and/or any combination of these and/or other networks.

In some embodiments, the first and second collection nodes 110, 135 may include a communications subsystem to communicate over the network 160. Accordingly, the first and second collection nodes 110, 135 may include, without limitation, a modem chipset (wired, wireless, cellular, etc.), an infrared (IR) communication device, a wireless communication device and/or chipset (such as a Bluetooth™ device, an 802.11 device, a WiFi device, a WiMax device, a WWAN device, a Z-Wave device, a ZigBee device, cellular device, etc.), and/or the like. The communications subsystem may permit data to be exchanged with the network 160, with other computer or hardware systems, and/or with any other devices, such as the one or more first host machine(s) 115, one or more first network device(s) 120, one or more first storage device(s) 125, one or more second host machine(s) 140, the one or more second network device(s) 145, and one or more second storage device(s) 150.

Accordingly, in various embodiments, the DSS 105 may be a centralized computer system, including one or more processors, such as, without limitation, one or more central processing units (CPU), or one or more graphics processing units (GPU), or a combination of different types of processors. In some embodiments, the DSS 105 may include dedicated custom hardware, such as a field programmable gate array (FPGA), modified GPU, an application specific integrated circuit (ASIC), or a system on a chip (SoC). Thus, in some examples, the DSS 105 may be a specifically targeted hardware appliance, or alternatively, a relational, database-driven device that performs various functions via dedicated hardware, in contrast with a CPU.

In various embodiments, the DSS 105 may be configured to request, receive, or otherwise obtain the data streams from the first and second collection nodes 110, 135. For examples, in one example, the DSS 105 may include a data stream buffer, such as a message buffer (e.g., an Apache Kafka buffer) in which data streams from the first and second collection nodes 110, 135 may be received and/or distributed by the data stream buffer as a stream of messages. In other embodiments, the first and second collection nodes 110, 135 may be bypassed, and data streams may be published directly to the data stream buffer of the DSS 105 by the respective devices of the first and second platforms 130, 155. In some further examples, the data streams may eventually be transferred into one of three environments. For example, in some embodiments, the DSS 105 may be configured to transfer the streams, from the data stream buffer, into a storage and processing environment (e.g., Apache Hadoop), in which data streams may be organized, processed, and grouped as desired. The DSS 105 may then be configured to send the processed data streams into different searchable indices, data structures, or databases, such as, without limitation, a relational structured query language (SQL) database, Apache Hadoop distributed file system, and ElasticSearch index, accessible via respective interfaces.

In various embodiments, the DSS 105 may further be configured to detect, in real-time, the presence of anomalies (e.g., anomalous states) from the data streams. Taking a high-level approach, for each unique stream of data collected, the DSS 105 may build a model of historic activity (also referred herein, interchangeably, as a historic model). The historic model may include time-series data indicative of a performance metric, and include a series of historic values, and a current value. The DSS 105 may further be configured to predict, based on the model of historic activity, in real-time, what a future value should be at a given time, for example, the next polling cycle or other future time. Accordingly, the historic values in the model of historic activity may be used to determine a predicted value of what the future value should be. If the future values (e.g., the actual value of the data stream at a given time in the future) are substantially different from the predicted values (e.g., predicted value at the given time in the future), the DSS 105 may be configured to trigger the system to flag the observation as an anomaly. In various embodiments, the degree of required variation (e.g., a threshold variation) between predicted and actual values may vary as a function of historic data. Once the DSS 105 determines to flag an anomaly, the DSS 105 may further be configured to update the historic model to update the calculation of expected and/or predicted values. Accordingly, in various embodiments, the historic models may be dynamic, and continuously run in real-time. Thus, performance of the algorithms and historic models may grow linearly with time.

In various embodiments, the threshold variation may be set based upon known maximum values within the service provider's cloud platform (e.g., the first platform 130 or second platform 155), or based upon historic analysis of maximal operating levels for the various cloud resources and system components (e.g., the one or more first host machine(s) 115, one or more first network device(s) 120, one or more first storage device(s) 125, one or more second host machine(s) 140, one or more network device(s) 145, and one or more second storage device(s) 150). Including the maximal values may allow alerts to be raised independent of any other relative comparisons performed.

In some embodiments, relative comparisons may be performed in the identification of anomalies. In one approach, sequential sampling techniques may be utilized. Another approach may include the use of windowing functions. In embodiments where the data streams are periodically generated, or performance metrics are periodically sampled, the DSS 105 may be configured to perform comparisons utilizing sliding windows. In a sliding window forecasting model, a predicted value (e.g., the next data point) may be determined by processing previous data points within a window (w) of fixed width. We set the width of this window to balance accuracy with algorithm performance.

In some embodiments, to increase the robustness of the algorithm to detect anomalies, noise may be accounted for by utilizing a smoothing function on the data stream. Accordingly, the DSS 105 may be configured to apply a smoothing function to the data stream. This may eliminate some of the short-term volatility in the data stream signal. A smoothing factor (s) may be tuned to fit each respective data stream. In various embodiments, the smoothing factor may be tuned by minimizing the resultant error in the historic model.

Furthermore, in various embodiments, the algorithm may be agnostic. In performing the algorithm, the DSS 105 may be configured to include memorization in the predictive framework for anomaly detection. To create this memory, the DSS 105 may be configured to base the predicted value upon a series of offsets of a respective data stream. The series of offsets may result in a set of phase shifts of size p. The set of phase shifts acts as a second sliding window that operates upon the data within the current window. Accordingly, the DSS 105 may be configured to apply a set of phase shifts to the data stream.

In various embodiments, the process for detecting anomalies may be computationally scalable, and distributable. Distributable may refer to the ability of the process to make the necessary determinations for a given time point without knowledge of the outcomes from similar calculations for nearby time points. Moreover, anomaly determination process may be incremental in that all calculations within a given window are built in a streaming manner. Accordingly, in various embodiments, a correlational dimension approach may be utilized, built in a distributed manner to function upon a data stream in real-time.

The following discussion is related to an example of an anomaly detection function of the DSS 105, according to various embodiments. In this example, the anomaly detection process may include: for each data stream, obtaining a new data point (e.g., performance metric data); sending each new data point in the data stream through an optional smoothing function; sending the new smoothed data point of the data stream into the data window; creating phase offsets for the windowed data stream; determining phase weights based on a correlation between all phase offsets and the window function; normalizing the phase weights; calculating the predicted values; calculating the standard deviation within the window; determining threshold variations by keeping track of a dynamic range for each data stream and/or performance metric; detecting, predicting, and alerting based on the relative comparison the data stream; storing accuracy of the historic model for later use; and passing the results of the relative comparison through heuristics.

In various embodiments, for each new data point (e.g., value) of the data stream obtained by the DSS 105, the DSS 105 may be configured to determine if there was a missing value since the last value. Each new data point may then be sent, by the DSS 105, through an optional smoothing function.

Applying the smoothing function to the new data value may boost accuracy and predictability of the data stream. In various embodiments, the DSS 105 may be configured to pass each data stream through a smoothing function that results in a rolling average of time-period "s," where "s" is an input parameter. Within the set of X, wherein X is the set of data points of the data stream, the smoothed point for a given data point x is denoted using the convention x'. Then the equation for x' is given by the following:

$$x' = \frac{\Sigma_s x_s}{s}$$

And to extend this to the set X' of X, the following operations may be performed:

$$X' = \{x'_1, \ldots, x'_i\}$$

The data window is a list of the previous values for a given metric. This list is of fixed length "w" operating in a first in first out (FIFO) fashion. Once the list fills with values, each new value causes a corresponding ejection of a historic value. Accordingly, in some embodiments, the DSS 105 may be configured to add the new smoothed data point to the data window.

In various embodiments, the DSS 105 may be configured to create phase offsets for the data window. A phase offset for a sequence "x" is equal to the sequence "x" offset by "p." For example, an offset of 1 on the sequence [1, 2, 3, 4] will be [_1, 2, 3]. To compare a sequence to its offset, the ability to compare the first p data points may be lost. Thus, the first p offsets for a particular sequence are created. If p=5, then 5 additional sequences are created, each offset by [1, 2, 3, 4, 5] points, respectively.

For each phase offset sequence, the DSS 105 may be configured to calculate the correlation between the phase offset sequence and the related elements from the non-offset sequence. To preserve parity of comparisons, in some embodiments, the DSS 105 may truncate all sequences to be the length of the minimum sequence. Because the shortest sequence will be that for the p offset, and because the minimum sequence will be of length w–p, the DSS 105 may use the last w–p items from each sequence, and persist the correlation values in relation to their phase offset. The DSS 105 may, therefore, be configured to incrementally determine the correlation between two sequence, x and y. For example, in some embodiments, the DSS 105 may determine the correlation utilizing the following formula:

$$r = \frac{n\Sigma xy - \Sigma x \Sigma y}{\sqrt{n\Sigma x^2 - (\Sigma x)^2} \sqrt{n\Sigma y^2 - (\Sigma y)^2}}$$

After determining the correlation, the DSS 105 may further be configured to determine whether the correlation value is significant. If the correlation value (also referred to as a correlation coefficient) is determined to be significant, the DSS 105 may be configured to persist the correlation values as-is. If the correlation value is not significant, the correlation value may be replaced with the value 0.

In various embodiments, the DSS may be configured to assess significance by performing a "t-test" with p<=0.05. The "t-test" is given by the formula:

$$t = r\sqrt{\frac{n-2}{1-r^2}}$$

and filtered based upon t≥1.96.

In some embodiments, the DSS 105 may be configured to calculate a weight for the phase offset. The weight for each phase offset may be a linear normalization of the phase weights relative to each other. For example, the phase weight may be given by the sum of all correlation coefficients and the phase weight for each phase offset may be set equal to the quotient of the correlation value and the sum of all correlation values, as given by the equation below:

$$w_p = \frac{\hat{w}_p}{\Sigma_q \hat{w}_q}$$

where $\hat{w}_p$ represents the correlation coefficient for phase sequence p. If the sum of the phase weights is equal to 0, then the phase weight for the p=1 offset may be set to equal 1.0.

With the phase weight determined, in various embodiments, the DSS 105 may be configured to determine predicted values of the data stream, in real-time. Where "e" represents the size of the embedded dimensions considered by the DSS 105, the next "e" values may be predicted for a given future point in time. In some embodiments, the DSS 105 may determine this by taking the last item in each phase-offset data stream, and multiplying it by the phase weight. The DSS 105 may then take the sum of the result to yield to the next predicted point, "$p_i$," as given by the following equation.

$$p_i = \Sigma_p w_{p_i} x_{p_i}$$

Which is the same as the more complicated:

$$p_i = \Sigma_p \frac{\hat{w}_{p_i} x_{p_i}}{\Sigma_q \hat{w}_{q_i}}$$

While the above illustrates how the DSS 105 may determine a predicted for the next data point in the data stream, the same technique may be applied to predict the next several points by feeding the first predicted point back into the prediction model for a subsequent predicted value.

In various embodiments, the variance for a sequence may be given by the sum of the differences between the current value and the average value for all values in the sequence divided by the length of the sequence. The standard deviation is the square root of this number.

$$\sigma = \sqrt{\frac{1}{N} \Sigma_N (x_i - \mu)^2}$$

Where:

$$\mu = \frac{1}{N} \Sigma_N x_i$$

Accordingly, the DSS 105 may be configured to calculate the standard deviation within the window, and further may be configured to persist a for later use.

To determine whether an anomaly has occurred, or alternatively, to determine whether to trigger an alert or an alarm in response to the occurrence of one or more anomalies, in various embodiments the DSS 105 may be configured to determine a threshold variance, and apply the threshold variance to the minimum and maximum range for each data stream (and associated performance metric). In some embodiments, a single global threshold variation may be used across data streams and/or associated performance metrics. In some embodiments, the range for each metric may be determined iteratively, by updating the minimum and maximum range for each data stream and/or associated performance metric. For example, as the DSS 105 encounters new values that are either larger or smaller than previously encountered, the DSS 105 may be configured to update its beliefs about the range of values for the given data stream and/or associated performance metrics. In some embodiments, the DSS 105 may accomplish this task by retrieving metadata, specific to a performance metric, from a knowledge base. This metric-specific metadata may include anticipated changes, scheduled or unscheduled events, time of year, holidays, customer specific information, other a priori information regarding anticipated variances, among other information regarding any changes that may impact data stream values or impact performance metrics on a given platform, such as the first platform 130, second platform 155, or both.

Given the future expected values, the DSS 105 may then detect anomalies, issue alerts, and predict future expected anomalies. In various embodiments, the DSS 105 may detect anomalies in a data stream when actual value of the data stream exceeds a range such as, for example, +/−σ from the predicted value. In response to detecting that the actual value of the data stream exceeds the range, in this example one standard deviation, the DSS 105 may be configured to raise an anomalous flag. In response to the flag, or multiple flags, the DSS 105 may further be configured to trigger an alert or alarm. In further embodiments, the DSS 105 may be configured to trigger an alert or alarm in response to the current value exceeding the threshold variation. In some further embodiments, the DSS 105 may be configured to predict future anomalies. In one example, when a predicted value for a data stream, as augmented by a scaling factor, exceeds the range of +/−σ from the unscaled predicted value, the DSS 105 may raise a prediction flag.

In some embodiments, before determining whether to trigger an alert, the DSS 105 may be configured to apply one or more business heuristics. Business heuristics may be prone to change over time, and thus may be modified or updated as desired. In some embodiments, business heuristics may include customer specific rules regarding how and whether to trigger an alert. For example, in some embodiments, a certain number of consecutive anomalies (t) may be required to trigger an alert. Many anomalous behaviors may return to normal quickly, and therefore it may be inefficient to raise alerts. Thus, in one example, when an anomaly is detected, the DSS 105 may wait to trigger an alert until the anomaly is detected for two consecutive polling cycles of the data stream. In further embodiments, a minimum magnitude, as a percentage of actual maximum (m), for data stream variation may be established to trigger an alert. This is one approach to detecting changes in signals relative to historic levels within the same signal. For signals that do not vary significantly over time, the size of an anomalous event may be tied to the maximum size of the value that we are measuring. For example, a 1% change may be anomalous on a signal that rarely varies, but may be filtered by criteria that requires the magnitude of an event to be at least 10% of the actual maximum value for that performance metric.

In various embodiments, the DSS 105 may store the accuracy of the model for later use. To measure accuracy across metrics and algorithms, the DSS 105 may utilize an extensible measure of accuracy, such as sMAPE. To find the accuracy of an actual value ($y_i$), compared to a predicted value ($\hat{y}_i$) the following equation may be used:

$$sMAPE_i = 200 * \frac{(|y_i - \hat{y}_i|)}{(y_i + \hat{y}_i)}$$

and $$SMAPE_{metric} = \frac{\Sigma_i sMAPE_i}{i}$$

In some embodiments, the DSS 105 may further range restrict these values to comply with $\{0,1\}$. For example:

$$sMAPE_{metric}{}' = \mathrm{argmin}\langle \mathrm{argmax}\langle sMAPE_{metric}{}', 0. \rangle 1. \rangle$$

The DSS 105 may record the accuracy alongside the predicted and actual values for use in future optimization.

The DSS 105 may further be configured to optimize several parameters in determining anomalies. In some embodiments, these parameters may include, without limitation: w—Window size; e—Embedding Dimensionality; s—Smoothing size; σ—Effect size; t—Number of consecutive anomalies required to trigger an alert; and m—Minimum magnitude as a percentage of actual maximum necessary to trigger alert.

In some embodiments, the DSS 105 may be configured to tie various iterations of the anomaly detection over the different possible states of these parameters. In further embodiments, the results of these iterations may be tied back to the accuracy determination previously described. In this way, the determination of anomalies may be optimized for each combination of performance metric and cloud resource (e.g., device).

As previously described, in various embodiments the DSS 105 may be configured to generate prediction alerts indicative of future incidents, based on the presence of anomalies in a data stream. In some embodiments, prediction alerts may be possible where a certain pattern of anomalies or signal patterns in the data stream continues. The DSS 105 may learn a scaling factor associated with historic values for the data stream. The scaling factor may be applied to future patterns in data streams to predict future expected values.

In some embodiments, the DSS 105 may be configured to implement a supplemental attribution-oriented approach to determine a severity level of different alerts across different performance metrics, and in turn, data streams. Thus, the DSS 105 may be configured to filter out alerts related to easily explainable and/or relatively trivial events, such as a power-on signal from a large virtual machine (VM). Similarly, the DSS 105 may determine that an alert triggered across all storage drives simultaneously may indicate the presence of a more serious problem than if it were triggered on a single device.

In further embodiments, the discovery of anomalous states may be one of three sets of flags that may be generated by the DSS 105. In addition to the flagging of anomalies, the DSS 105 may further be configured to generate SNMP alerts, and a set of alerts defined by business heuristics. In some embodiments, the flagging of anomalies may have a signal-to-noise ratio (SNR) that is approximately 40× higher than heuristic based alternatives. During periods of instability, anomalies tend to co-occur across various subsets of data streams within a platform, such as first platform 130 and second platform 155. During the onset of hardware failures, anomalies often precede a hard failure event. Thus, in various embodiments, the anomalies may represent a soft failure that may act as a leading indicator. Of the primary sources of instability that incident detection is tasked with, the presence of anomalies tends to converge during periods of instability relating to each of these possible etiologies. Sources of instability may include, without limitation, hardware failure events, software configurations, and attacks. In various embodiments, subsequent processes may utilize the anomalies to determine whether an incident is taking place, and to take remedial actions in response to a predicted incident. Remedial actions may include, without limitation, triggering alerts, making recommendations to avoid or fix an incident, alerting a virtual network interface card (VNIC) or a set of VNICs, or a combination of the above techniques.

In various embodiments, the DSS 105 may further be configured to discover and agglomerate similar states. As previously discussed, the presence of anomalies tends to converge during periods of instability, such as hardware failure events, software configuration failures, and attacks. The following description is related to a clustering function of the DSS 105, according to various embodiments.

For example, in various embodiments, the DSS 105 may be configured to find data streams with similar attributes, such as, for example, anomalies or anomalous behavior. In some embodiments, the DSS 105 may be configured to define various "centroids" within a data stream. Centroids may be defined arbitrarily, in which each section of a time series (e.g., segments of the data stream) will coalesce around the centroids. Thus, similarly shaped time-series patterns may be found based on these centroids. The centroids may then be stored for later use by the DSS 105.

In various embodiments, the DSS 105 may then define one or more "buckets" for each of the data streams. Thus, each of the plurality of data streams generated within the cloud platform, such as by the one or more first host machine(s) 115, one or more first network device(s) 120, one or more first storage device(s) 125, one or more second host machine(s) 140, one or more network device(s) 145, and one or more second storage device(s) 150, may be grouped into logical sub-streams of data as defined by the buckets. For example, a bucket may group data streams by data center (e.g., data streams originating from a common data center are grouped into the same bucket). In other examples, buckets may include, without limitation, grouping by business process, specific cloud-based application or service, a group of applications or services, a customer, a group of customers, geographic areas, a specific data center, a group of data centers, by type of performance metric (e.g., grouping data streams by network, storage, compute, and VM-related time-series performance metrics), by device type, and other logical groupings. In some embodiments, the DSS 105 may track various data streams (e.g. performance metric) and their associated buckets. Thus, the DSS 105 may further create, define, or otherwise obtain identifying information (e.g., unique identifications (ID)) for each data stream, bucket, data center, device or component associated with the data stream, centroid, or a combination of these attributes. For example, in the embodiments below, the concept of a metric ID may be used, in which the metric ID may include identifying information for a group of attributes, including, without limitation, the data center, the device, the component, the name of the performance metric, and the associated centroid ID.

In further embodiments, the DSS 105 may separate each data stream into a given time interval, such as, without limitation, hourly intervals. For a given interval, the DSS 105 may determine whether there is a requisite number of data points (e.g., observations). For example, in some embodiments, each data stream may include 12 data points for each hour. In other embodiments, a different number of data points may be used. For the example of 12 data points per hour, the DSS 105 may round down each data point to the closest 5-minute interval. In some embodiments, if more than one data point is present for a 5-minute interval, the DSS 105 may use a data point closest in time to the 5-minute interval may be used. In some further embodiments, if no data points are available for a 5-minute time interval, the DSS 105 may use a 0 value as the data point.

In some embodiments, the DSS 105 may be configured to determine a centroid based on a data value of the data stream, and a configuration value of the data stream. In some example, the data stream may be separated into data segments with a one-hour interval worth of data points from one of the buckets described above. The data segments of the data stream may allow the DSS 105 to run a separate process for each data segment, in this example one-hour in length. The DSS 105 may then utilize the configuration data associated with the data stream to determine a level of precision. Based on the configuration data and the number of unique data streams within the bucket, the DSS 105 may then determine the number of centroids to create.

In some embodiments, the DSS 105 may be configured to perform a numerical distance-based clustering technique (such as K-Means clustering) to create "K" number of centroids. The DSS 105 may pass the desired level of precision and the K value of to determine a set of K centroids. In this example, the DSS 105 may determine that each centroid will have a vector length of 12.

Once the DSS 105 has determined the each of the K centroids, the DSS 105 may classify each data stream, data stream segment, or both, based on the centroid to which it is closest in proximity. In some embodiments, the DSS 105 may define proximity to a centroid using Euclidean distance (e.g., the square root of the sum of the squared distance between each set of points). In various embodiments, based on these determinations, the DSS 105 may generate a list of centroid IDs and their related 12-value vector. Furthermore, each unique data stream, or each unique data stream segment, may further be associated with the cluster ID of the closest cluster of data streams.

In various embodiments, the DSS 105 may the store the centroids and data stream classifications. In some embodiments, the DSS 105 may utilize two types of storage—1) for centroid data; and 2) for classification data of the data stream and/or data stream segments. The centroid data may include, without limitation, the time interval, centroid ID, value ID, and the value for each of the 12 values in each centroid ID. The classification data may include, without limitation, the time interval, and a data stream ID (or alternative data stream segment ID). Through this storage arrangement, the DSS 105 may create two sets of data that are accessible using the IDs (e.g., centroid ID, data stream ID, data stream segment ID, etc.) described above.

In various embodiments, the DSS 105 may further be configured to then search for nearest neighbors within a search set based a search vector. The DSS 105 may be configured to determine the set of data streams, data stream segments, or both, that exhibits a pattern most similar to the patterns found in metrics related to a user-defined search vector or set of parameters. Accordingly, the DSS 105 may allow searches via a user-defined search query, such as a search vector or a set of search parameters. If a search uses a set of parameters, it must include everything present within a metric ID (or data stream ID/data stream segment ID), and a search interval. For example, the set of parameters may include, without limitation, the time interval, a data center, device, component, and performance metric name. In some embodiments, when searching with a set of parameters, the DSS 105 may look up centroids for one or more user-defined data streams. If the search uses a search vector, the DSS 105 may translate the search vector to arrive at a set of centroid IDs. In some embodiments, the DSS 105 may classify the search vector into a set of cluster IDs. This may include, in some embodiments, looking up centroid values and performing a Euclidean distance search, as previously described with respect to the association of data streams/data stream segments with centroid IDs.

In various embodiments, the DSS 105 may then be configured to find a match rate between the search vector and all target vectors. For each search vector, the DSS 105 may query the set of data streams related to a search bucket. Each unique data stream in the bucket may be eligible target vectors for the search vector (e.g., each unique data stream may be associated with a respective target vector). For each matching target vector, the DSS 105 may then determine the centroid IDs for the given time interval. The DSS 105 may further be configured to keep a count of the total number of that each target vector has the same centroid ID as the search vector. Accordingly, this number may represent the match rate between the search vector and target vectors.

In some embodiments, the DSS 105 may perform an early termination of the search. For example, in some embodiments, the DSS 105 may remove all metric IDs (or alternatively, data stream IDs, or data stream segment IDs) that have a match rate below a configurable threshold value. The threshold value of the match rate may be defined, for example, at 50%. The remaining metric IDs and their respective match rates may be persisted (e.g., saved) and associated with the search vector.

The DSS 105 may further determine a numerical proximity between the search vector and eligible target vectors. For example, in some embodiments, the DSS 105 may determine, for the matching metric IDs that remain, a correlation coefficient and a significance rate. To determine the correlation coefficient, in some embodiments, the DSS 105 may be configured to approximate the correlation coefficient based on the centroid values, which provides a scalable approach. In another embodiment, the DSS 105 may be configured to determine the correlation between each performance metric (e.g., data stream or data stream segment) and the search vector. Thus, the DSS 105 may trigger a separate correlation determination for each performance metric (e.g., data stream or data stream segment), and thereby distribute the correlation determination process. In various embodiments, once the correlation value has been determined, the DSS 105 may be configured to calculate the significance rate using, for example, a t-distribution.

In some further embodiments, the DSS 105 may then, for any identified nearest neighbors, determine neighbors for each of the identified nearest neighbors. For example, in some embodiments, the DSS 105 may similarly find a match rate between a search vector (e.g., the nearest neighbor) and eligible target vectors. Thus, in some embodiments, the DSS 105 may determine a set of connections between nearest neighbors, and neighbors of nearest neighbors.

In various embodiments, the DSS 105 may then create directed graphs of this data. Directed graphs may represent centroids, performance metrics, data streams, or data stream segments as nodes, and relationships as edges. Thus, a directed graph may visualize the data in a way that is easier for humans to interpret. In some embodiments, the DSS 105 may be configured to optimize one or more filter thresholds for the directed graph. By optimizing the filter thresholds, the DSS 105 may be able to remove frivolous connections from the directed graph. For example, in some embodiments, the DSS 105 may sort all correlation coefficients for all metric IDs and sort them. If graphed in a directed graph, an "S"-shaped curve may be formed with two knees, a respective knee at each bend. A filter threshold may be placed at one or more of the knees. For example, in one embodiment, a filter threshold may be placed at the "upper knee" of the curve. In some embodiments, filter placement may be determined by approximating the percentile at which the "upper knee" occurs for the set of correlation coefficient data. For example, in one embodiment, the DSS 105 may choose a filter threshold between the 90-95 percentile for the correlation coefficient. A similar process may be utilized for match rate, and statistical significance (in which case a 5-10 percentile may be used, where a lower value represents more significance). In other embodiments, other percentile ranges and percentile values, from 0-100 inclusive, may be utilized for the filter threshold. Thus, the DSS 105 may generate for each of the correlation coefficient, match rate, and statistical significance, a list of filter thresholds.

In various embodiments, the DSS 105 may then filter the nearest neighbors based upon the optimized filter thresholds. For example, in some embodiments, the DSS 105 may remove all connections to and between neighbors that do not meet the filter threshold for the match rate, correlation coefficient, and statistical significance. In further embodiments, the number of total connections for the directed graph may be limited by the DSS 105. In one example, the DSS 105 may be configured to establish a first "N" number of connections for each node. Thus, the rood node may only have N connections with the highest match rate, correlation coefficient, and statistical significance. Next, each neighbor of the root node may, similarly, be limited to a total of N connections. Thus, each neighbor will be limited to N neighbors. Thus, the DSS 105 may determine a proposed list of connections for the directed graph.

In some embodiments, the DSS 105 may then generate the directed graph of the neighbors. In some embodiments, the DSS 105 may generate a graph object of the directed graph. Based on the directed graph, the DSS 105 may further determine strongly connected components. As known to those in the art, this may include, without limitation, utilizing Kosaraju's algorithm combining a breadth-first search with a backtracking search phase. In further embodiments, the DSS 105 may then be configured to prune the directed graph by removing nodes and connections determined not to be a strongly connected component.

In further embodiments, the DSS 105 may be configured to determine a root cause of an incident, based on the nodes and connections. For example, the DSS 105 may be configured to determine the culpable actors in a causal network, and to predict changes in the overall network based on a change in one actor's behavior (e.g., a node). In further embodiments, the DSS 105 may determine a degree of influence of a node (or centroid, data stream, data stream segment, metric ID) on the behavior of the overall system. This may further be used, by the DSS 105, to predict future expected value of a data stream.

In various embodiments, the DSS 105 may then, based on the directed graph, elevate the set of data to a candidate alert. For example, at a high level, after a set of data streams exhibiting similar anomalies has been identified as previously described, the DSS 105 may create a candidate alert for the set of data streams. As previously described, to visualize the results of a candidate alert, consider a directed graph containing nodes and edges. In some embodiments, the nodes may represent a device/sub-interface that generates a unique data stream. The connections between the nodes may represent statistically significant relationships between nodes based upon similarities of their respective data streams.

Each set of data streams identified by the DSS 105 as sharing similar anomalies, as described previously, may represent a period of instability within the cloud platform. However, in some embodiments, it may not be desirable to not take an action for every detected period of instability. For example, in some embodiments, a large-scale application deployment may exert a significant load upon the cloud platform (e.g., first platform 130, second platform 155), which may be a valid event, and should not be flagged, trigger an alert, or cause remedial action to be taken. Thus, a false positive may be triggered by such an event. To reduce false positives over time, the DSS 105 may incorporate analyst (e.g., user) feedback to help the system tag each identified cluster of data streams. Therefore, in some embodiments, the DSS 105 may determine a belief regarding the root cause for a detected instability based on the tag. By allowing analysts to tag each cluster, in some embodiments, the DSS 105 may learn to categorize a cluster of data streams as one of several types of clusters of data streams. In some embodiments, each time an analyst tags a cluster of data streams, the DSS 105 may propagate the tag to all relevant data streams of the cluster of data streams, or additionally, to other clusters of data streams with similar or related characteristics.

In some embodiments, through multiple iterations and integration with a specific cloud platform, the number of candidate alerts may become more manageable (e.g., decrease in number and frequency), and each candidate alert may better predict the occurrence of an actual incident (e.g., increase in accuracy) over time. In further embodiments, the DSS 105 may be configured to perform automated actions in response to the occurrence of certain types of incidents, as identified by the candidate alert. To allow the DSS 105 to better determine the type of incident (e.g., determine root cause), the DSS 105 may provide visualization of the incidents, using real-time data, to an analyst. Accordingly, the DSS 105 may be configured to provide the unique data streams, anomalies, and clusters of data streams to an analyst.

In various embodiments, the candidate alerts may provide a warning 30-45 minutes in advance of an occurrence of an incident. If an incident takes place, the DSS 105 may allow users to access further details related to the various contributing factors of the incident. In further embodiments, the DSS 105 may provide additional integration points within the triage and retrospective processes. For example, in some embodiments, upon the triggering of a candidate alert or the occurrence of an incident, the DSS 105 may receive a trouble ticket from a user, and relate the trouble ticket to the candidate alert. A trouble ticket may, in some embodiments, initiate a triage process that alert designated users or systems, such as, for example, on-call experts and customer service agents. For every incident, the DSS 105 may also perform a retrospective process that facilitates understanding the scope of impact as well as determination of a root cause, by associating a cluster, candidate alert, or data stream with the trouble ticket, or a tag (as previously described).

In further embodiments, in addition to learning from user inputs regarding the root cause of incidents and candidate alerts, the DSS 105 may be configured to learn through historic activity. For example, DSS 105 may learn what actions were taken by a provider in response to a certain type of incident, candidate alert, cluster, or data stream. In some embodiments, the DSS 105 may categorize identified root causes for an incident, and map the root cause to an expected action. Thus, the DSS 105 may be configured to automatically mitigate or otherwise respond to certain periods of instability.

Although the foregoing discussion of examples and embodiments have focused on the functions of the DSS 105, they should not be taken as limiting. It is to be understood that in other embodiments, the first and second collection nodes 110, 135 may perform one or more of the functions described above with respect to the DSS 105, for the service provider's cloud platform, or for a respective cloud platform (e.g., the first and second platforms 130, 155, respectively).

Figure 2:
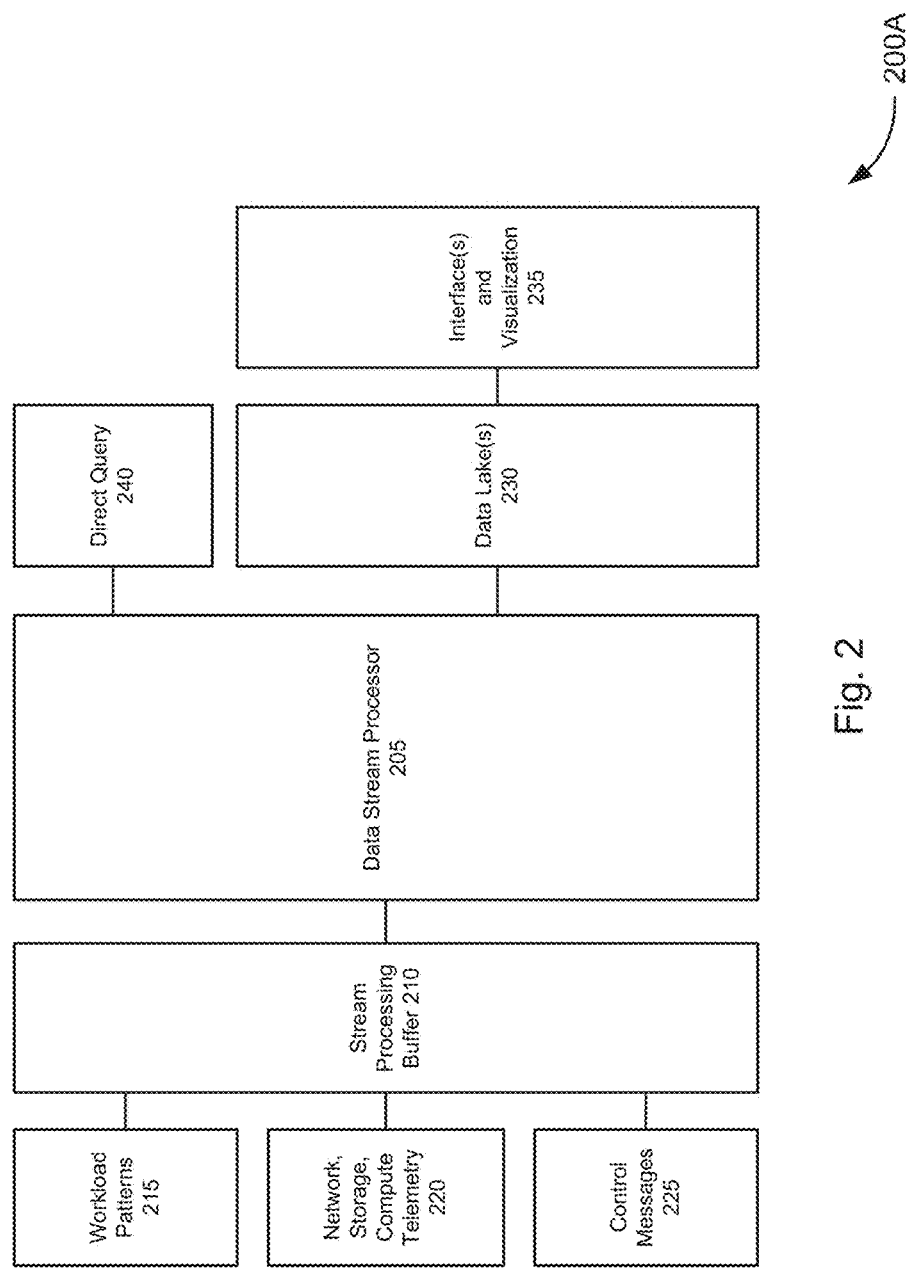
FIG. 2 is a schematic block diagram of an analytics architecture for the machine discovery and rapid agglomeration of similar states, in accordance with various embodiments.

FIG. 2 is a schematic block diagram of an analytics architecture 200 for the machine discovery and rapid agglomeration of similar states. According to various embodiments, the analytics architecture 200 may be a logical framework for the handling and storage of data streams by a cloud platform, and associated monitoring or management system of a cloud platform. For example, the analytics architecture 200 may include a data stream processor 205, stream processing buffer 210, workload patterns 215, network, storage, compute telemetry 220, control messages 225, one or more data lakes 230, interfaces and visualization 235, and direct query 240. It should be noted that the components of the analytics architecture 200 are schematically illustrated in FIG. 2, and that a variety of other configurations are possible in accordance with various embodiments.

In various embodiments, the workload patterns 215, network, storage, compute telemetry 220, cloud messages may feed into the stream processing buffer 210. The stream processing buffer 210 may then be coupled to the data stream processor 205. The data stream processor 205 may then create or transmit data into one or more data lakes 230. The data lakes 230 may, in turn, be coupled to one or more respective interfaces and visualization tools 235. The data stream processor 205 may further be directly coupled to direct query 240, which may directly access data stream processor 205.

In various embodiments, each of the workload patterns 215, network, storage, computer telemetry 220, and control messages 225 may be sources of data points or one or more data streams that flow into the stream processing buffer. Workload patterns 215 may include, without limitation, historic data and models associated with a device, customer, or platform. In some embodiments, workload patterns 215 may be provided to the stream processing buffer 210 by the customer, device, or platform, while in other embodiments, workload patterns 215 may be generated by the data stream processor 205, and fed back into the stream processing buffer 210 for re-use by the data stream processor 205. For example, as previously described, in some embodiments, the data stream processor 205 may determine anomalies, clusters of anomalous data streams, other "normal patterns" of historic information for a data stream or performance metric, alerts, thresholds, and other workload-related patterns. These workload patterns 215 may then be provided, by the data stream processor 205, back to the stream processing buffer 210 for later use. Network, storage, compute telemetry 220 may include various performance metrics generated by the various network, storage, and compute resources of a cloud platform, as well as various identifying information (e.g., metric ID, data center, the device, the component, the name of the performance metric, etc.) In various embodiments, network, storage, compute telemetry 220 may include data generated by telemetry tools and/or by the cloud resources (e.g., servers, host machines, virtual machines, network devices, storage devices, etc.). Accordingly, the network, storage, compute telemetry 220 may provide telemetry data (performance metrics, identifying information) for the generation of unique data streams. Control messages 225 may include various control messages for within a cloud platform. For example, control messages 225 may include, without limitation, SNMP messages and responses, control signals for the stream processing buffer 210, or control signals for the data stream processor 205.

In various embodiments, the stream processing buffer 210 may be a message-based buffer for real-time data streams. The stream processing buffer may, for example, be a publish and subscribe message queue system. Thus, the stream processing buffer 210 may allow devices and tools, such as the devices, sub-interfaces of the devices, and telemetry tools of the cloud platform, to publish their data as respective, unique data streams to the stream processing buffer 210. The data stream processor 205 may then access the data streams from the stream processing buffer 210 by subscribing to the data streams within the stream processing buffer.

In various embodiments, the data stream processor 205 may be configured to process a plurality of data streams, in real-time. In further embodiments, the data stream processor 205 may further include a framework for the storage and distribution of each of the data streams. For example, the data stream processor 205 may be configured to generate one or more data lakes 230 from one or more data streams. In some embodiments, the data stream processor 205 may be configured to perform one or more of the functions of the DSS 105, as previously described, including, without limitation, the discovery of anomalies, and the agglomeration of data streams with anomalous states.

In various embodiments, data streams from the data stream processor 205 may flow into one or more data lakes 230. In some embodiments, the one or more data lakes may include, without limitation, various types of search indices, relational databases, and the like. The data stream may then be accessed, from the one or more data lakes 230, via various respective user interfaces 235 and visualization tools by a user and/or analyst as previously described. In further embodiments, the data stream processor 205 may be directly queried, by direct query 240, for direct access to one or more data streams. For example, in some embodiments, direct query 240 may be an SQL, or access by a user and/or analyst, as previously described.

Figure 3A:
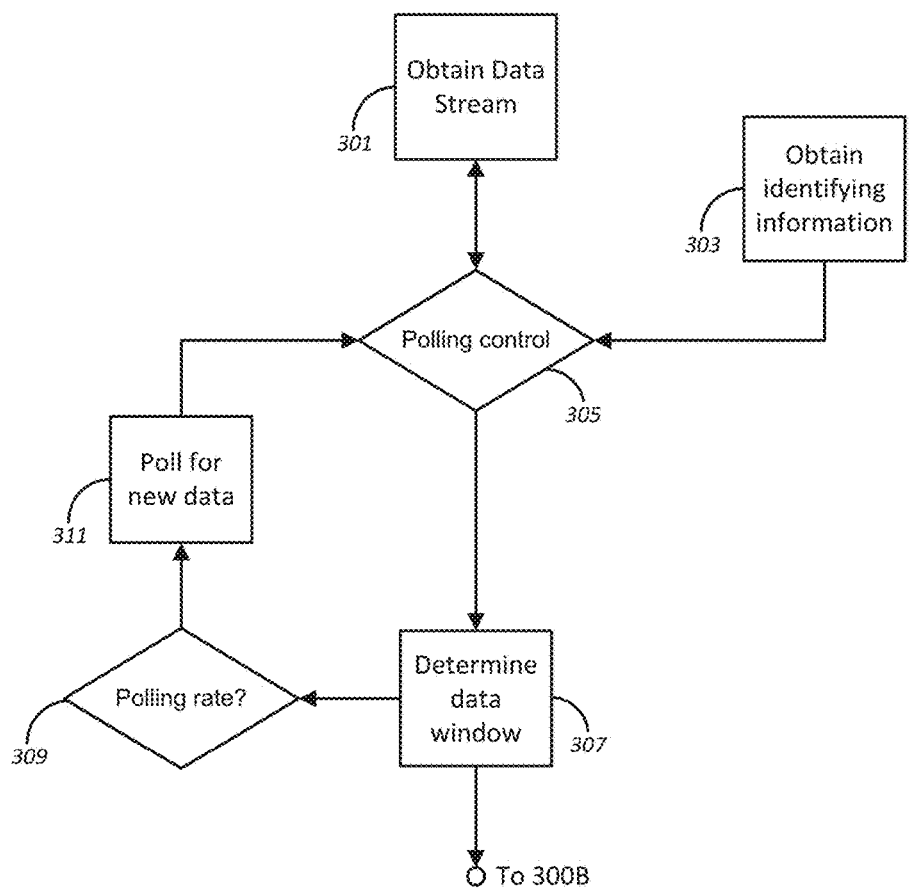
FIG. 3A is a flow diagram of a method of an observation layer of a process for the machine discovery and rapid agglomeration of similar states, in accordance with various embodiments.

FIG. 3A is a flow diagram of a method of an observation layer 300A of a process for the machine discovery and rapid agglomeration of similar states, in accordance with various embodiments. The method of the observation layer 300A begins, at block 301, by obtaining a data stream. As previously described, data streams may be generated by the various cloud resources of a platform, including, without limitation various compute, network, and storage resources. For example, data streams may be generated by, without limitation, various devices and their sub-interfaces such as servers, physical machines and virtual machines, network devices, storage devices, and any associated telemetry instrumentation. Data streams may include real-time data regarding the health and performance metrics, and network activity of the respective devices of a cloud platform. In various embodiments, each unique data stream may be associated with a respective device and all its sub-interfaces. Thus, as previously described, the plurality data streams may be collected by a DSS, a collection node, or other centralized monitoring or management system.

The method of the observation layer 300A continues, at block 303, by obtaining identifying information. In some embodiments, this may include topology discovery of the cloud platform by the DSS. In various embodiments, the identifying information may include, as previously described, information uniquely identifying each data stream, bucket, data center, device or component associated with the data stream, centroid, or a combination of these attributes. These may include various unique IDs, for example, a metric ID and previously described. Accordingly, the identifying information may be collected and/or assigned by a DSS, a collection node, or other centralized monitoring or management system.

The method of the observation layer 300A may continue, at decision block 305, where it may be determined to poll for data stream data, or whether data stream data has been received in response to the polling. For example, in various embodiments, a DSS or collection node may obtain data stream data and associated identifying information by polling each of the various devices. Polling of a data stream may include, in some embodiments, via active polling (e.g., SNMP-based polling), and passive receiving (e.g., SNMP messages, alerts, and other data).

At block 307, the method of the observation layer 300A may continue by determining an appropriate data window for the data stream. As previously described, in various embodiments, the DSS may be configured to implement a windowed forecasting model. Accordingly, the DSS may determine an appropriate window of the data stream. In some embodiments, this may include applying a window function to the data stream to isolate the desired range of data points in a data stream. This may include, for example, restricting the window by number of data points or time, and by shifting the data points in a data stream by determining a phase shift to apply to a window.

At decision block 309, the method of the observation layer 300A may continue by determining a polling rate. As previously described, this may include determining, via the DSS, if there was a missing value since the last value, and adjusting a polling rate. In various embodiments, each of the sources of data for various data streams may have differing polling rates for each type of data stream/polling metric. Accordingly, in some embodiments, the DSS may establish an overall polling rate may with a granularity sufficient to measure variance across devices.

At block 311, the method of the observation layer 300A may continue by polling for new data according to the previously determined polling rate. Thus, returning to decision block 305, the DSS determines whether to poll for new data stream data.

Concurrently, in various embodiments, the method of the observation layer 300A may continue to the method of the pre-processing layer 300B, once the data stream segment (e.g., windowed data stream), has been determined at block 307.

Figure 3B:
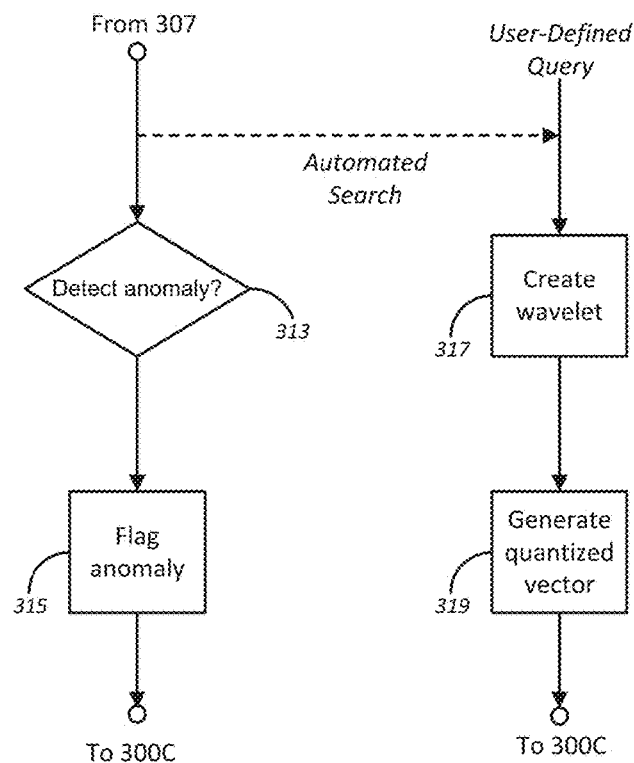
FIG. 3B is a flow diagram of a method of a pre-processing layer of a process for the machine discovery and rapid agglomeration of similar states, in accordance with various embodiments.

FIG. 3B is a flow diagram of a method of a pre-processing layer 300B of a process for the machine discovery and rapid agglomeration of similar states, in accordance with various embodiments. The method of the pre-processing layer 300B may begin after a window for the data stream has been determined. At decision block 313, it may be determined whether an anomaly is present in the data stream (e.g., windowed data stream). For example, as previously described, in various embodiments, the DSS may determine, in real-time, the presence of anomalies (e.g., anomalous states) in the data streams. In some embodiments, the DSS may build a historic model, and predict, based on the historic model, in real-time, what a future value should be at a given time. If the future values of the data stream are substantially different from the predicted values, the DSS 105 may be configured to determine that an anomaly has occurred.

If an anomaly has been detected, the method may continue, at block 315, by flagging the anomaly. For example, in some embodiments, the DSS may be configured to determine whether to flag an observation in a data stream as an anomaly. This may include, for example, determining a threshold variation between predicted and actual values, which may vary as a function of historic data (e.g., the historic model). Once the DSS 105 determines to flag an anomaly, the DSS 105 may further be configured to update the historic model to update the calculation of expected and/or predicted values.

At block 317, the method of the pre-processing layer 300B may further include creating a wavelet based on the data stream, via an automated search process, or based on a user-defined search query. For example, in various embodiments, the DSS may be configured to create an internal vector representation of the data stream parameters automatically, for example, by periodically generating a search based on the data stream, or alternatively, create an internal vector representation of a user-defined search query. As previously described, to create the internal vector representation, the DSS may be configured to perform frequency and time compression technique, also referred to as a wavelet transformation, to represent the data stream as a vector. Based on the wavelet transformation, at block 319, the method of the pre-processing layer 300B may continue by generating a quantized vector. As previously described, in various embodiments, the DSS may be configured to performs a timeseries compression technique called vector quantization. For example, in one embodiment, the DSS may perform a K-means algorithm to create a unique set of centroids for each platform, data center, or group of data streams. Each data stream may be normalized prior to centroid creation, as described with respect to previous embodiments, and subsequent vector quantization may take place on the normalized versions of the original vectors.

Figure 3C:
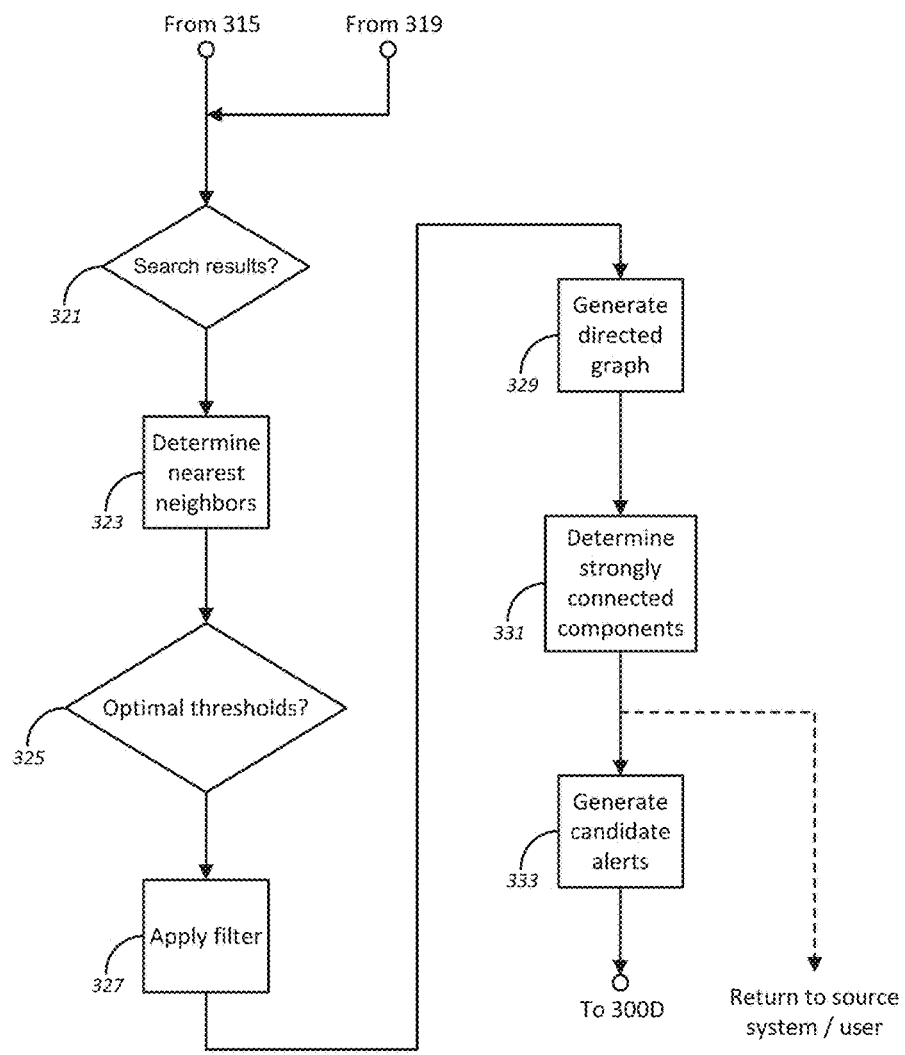
FIG. 3C is a flow diagram of a method of a detection layer of a process for the machine discovery and rapid agglomeration of similar states, in accordance with various embodiments.

FIG. 3C is a flow diagram of a method of a detection layer 300C of a process for the machine discovery and rapid agglomeration of similar states, in accordance with various embodiments. The detection layer 300C may, in various embodiments, be related to the determination and detection of incidences, based on the presence of anomalies occurring simultaneously across groups (e.g., clusters) of data streams. Accordingly, the method of the detection layer 300C may begin, at decision block 321, by determining a group of data streams that exhibit similar, simultaneous changes (e.g., anomalies). In some embodiments, the DSS may be configured to seed a search head using other data streams that have recently experienced anomalies.

The method of the detection layer 300C may continue, at block 323, by determining a set of nearest neighbors. In various embodiments, the DSS may be configured to determine a set of nearest neighbors, as previously described with respect to FIG. 1. In some embodiments, neighbors of neighbors may further be determined. For example, in some embodiments, the DSS may be configured to utilize a fast, approximate search technique to collect streams with similar centroids.

At decision block 325, the method of the detection layer 300C may continue by determining the optimal filter thresholds for filtering the neighbors may be determined. As previously described, in various embodiments, the DSS may be configured to optimize one or more filter thresholds for the clusters of data streams (e.g., nearest neighbors). For example, the DSS may determine a filter threshold between the 90-95 percentile for the correlation coefficient, match rate, and statistical significance (in which case a 5-10 percentile may be used, where a lower value represents more significance). In other embodiments, other percentile ranges and percentile values, from 0-100 inclusive, may be utilized for the filter threshold. Thus, the DSS may generate for each of the correlation coefficient, match rate, and statistical significance, a list of filter thresholds.

At block 327, the method of the detection layer 300C continues by applying the filter thresholds. In various embodiments, the DSS may perform a series of statistical-based filtering techniques to yield a more precise set of data streams. For example, as previously described, the DSS may filter the nearest neighbors based upon the optimized filter thresholds. For example, in some embodiments, the DSS may remove all connections to and between neighbors that do not meet the filter threshold for the match rate, correlation coefficient, and statistical significance. In further embodiments, the number of total connections for the directed graph may be limited by the DSS to an "N" number of connections for each node (e.g., neighbor). Thus, the DSS may determine a proposed list of connections for the directed graph.

At block 329, the method of the detection layer 300C continues by generating a directed graph. As previously described, the DSS may generate the directed graph based on the filtered group of nearest neighbors and their connections (e.g., data streams). Based on the directed graph, at block 331, the method of the detection layer 300C may continue by determining strongly connected components. In some embodiments, this may include the DSS determining strongly connected components utilizing, for example, a breadth-first search with a backtracking search phase. In some further embodiments, the DSS may then be configured to prune the directed graph by removing nodes and connections determined not to be a strongly connected component. In an alternative embodiment, the result of the strongly connected components determination may further be returned to a source system or user as a set of results of a search query.

The method of the detection layer 300C continues, at block 333, by generating candidate alerts. In some embodiments, this may include determining, via the DSS and based on the directed graph, to elevate the set of data streams to a candidate alert. For example, at a high level, after a set of data streams exhibiting similar anomalies has been identified as previously described, the DSS may create a candidate alert for the set of data streams.

Figure 3D:
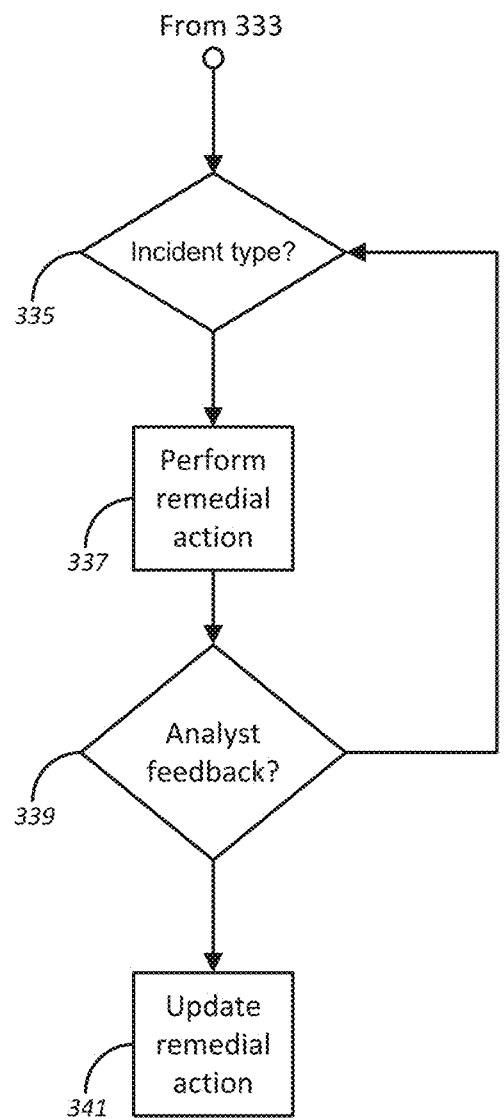
FIG. 3D is a flow diagram of a method of an action layer of a process for the machine discovery and rapid agglomeration of similar states, in accordance with various embodiments.

FIG. 3D is a flow diagram of a method of an action layer 300D of a process for the machine discovery and rapid agglomeration of similar states, in accordance with various embodiments. The method of the action layer 300D begins, at decision block 335, by determining an incident type. In various embodiments, the DSS may be configured to determine a type of incident based on, for example, one or more of the data streams, the candidate alert, or a root-cause of the anomalies. For example, in some embodiments, the DSS may determine, based on the data stream, performance metrics, associated device, component, data center, or cloud platform, a type of incident related to the candidate alert. In further embodiments, the type of incident may be determined, by the DSS, based on analyst input (as depicted at decision block 339) or historic data (e.g., of the historic model).

At block 337, the method of the action layer 300D may continue by performing a remedial action, via the DSS. As previously described, in various embodiments, the DSS may be configured to take remedial actions in response to a predicted incident. Remedial actions may include, without limitation, triggering alerts, making recommendations to avoid or fix an incident, alerting a virtual network interface card (VNIC) or a set of VNICs, or a combination of the above techniques.

At decision block 339, the method of the action layer 300D continues by determining whether analyst feedback is available. As previously described, in various embodiments, the DSS may use analyst feedback in both incident type determinations and to update remedial actions. To better determine the type of incident (e.g., determine root cause), in some embodiments, the DSS may provide visualization of the incidents, using real-time data, to an analyst. Accordingly, the DSS may be configured to provide the unique data streams, anomalies, and clusters of data streams to an analyst. In various embodiments, analyst feedback may include input from a human user. However, in further embodiments, analyst feedback may include input from diagnostic tools, devices, and software, which may provide feedback regarding desired outcomes, such as remedial actions, without the need for human interaction. At block 341, the DSS may update the remedial action taken to include analyst feedback, or to indicate that the remedial action was performed that is historically associated with the type of incident, candidate alert, cluster, or data stream.

FIG. 4 is a schematic illustration of a failure pattern 400 and anomaly alignment across multiple devices, in accordance with various embodiments. The failure pattern 400 may depict the occurrence of an anomaly (e.g., anomalous state) in solid black, and normal states in white. Each row of the failure pattern 400 represents the data stream of a unique device 410 over time 405. Accordingly, the failure pattern 400 may show the alignment of anomalous states over time across multiple unique devices in alignment regions 415.

In various embodiments, the failure pattern 400 depicts the presence of anomalies leading up to an incident. In this example, the actual onset of a customer impacting incident occurred around 45 minutes after the first (in time) of the alignment regions 415. Recall that anomalies occur relative to the historic values for each data stream. Accordingly, the failure pattern 400 depicts relative changes on individual signals, with differing internal states, taking place at the same time.

Figure 5:
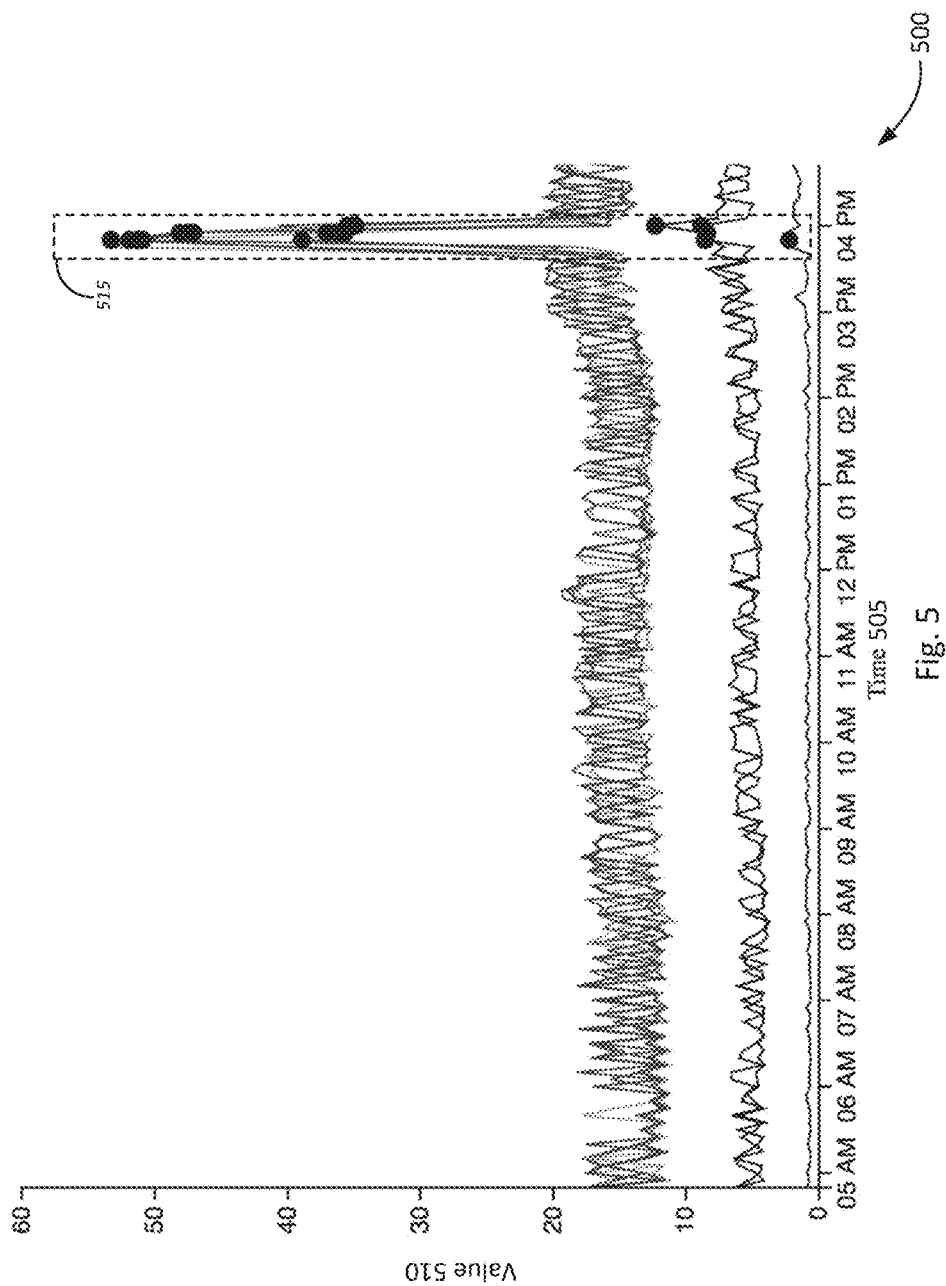
FIG. 5 is a schematic illustration of a group of data streams exhibiting an anomalous pattern over time, in accordance with various embodiments.

FIG. 5 is a schematic illustration of a group of data streams 500 exhibiting an anomalous pattern over time, in accordance with various embodiments. The value 510 of each data stream is depicted over time 505. Each plotted line of the group of data streams 500 shows the internal state (value 510) of each unique data stream, in-real time. As depicted, in anomalous region 515, a plurality of anomalies occur across all data streams of the group of data streams 500, at roughly the same time.

Thus, in various embodiments, the group of data streams 500 is an example of many simultaneous anomalies occurring across different types of data streams during a period of instability brought about as the result of an application-level software configuration problem. Having shown the usefulness of discovering the simultaneous occurrence of anomalies, as previously described, a DSS may detect the occurrence of incidences by identifying clusters of instability.

As previously described, the DSS may perform a time-series compression technique, such as vector quantization. For example, in some embodiments, the DSS may perform a K-Means algorithm optimized for distributed performance to create a unique set of centroids to characterize each platform, data center, group of devices, customer deployments, or groups of data streams. Each data stream may be normalized prior to centroid creation, and subsequent vector quantization may be performed on normalized versions of the original input vectors. The DSS may then search for other data streams (e.g., nearest neighbors) that exhibit similar, simultaneous anomalous behavior. In further embodiments, the DSS may utilize fast, approximate search techniques to determine clusters of data streams with similar centroids. The DSS may then filter the data streams, based on optimized filter thresholds, and create a directed graph based on the filtered cluster of data streams. The DSS may further determine a set of strongly connected components, based at least in part on the directed graph, to determine whether to elevate the cluster of data streams to a candidate alert (e.g., determine whether to trigger an alert).

Figure 6:
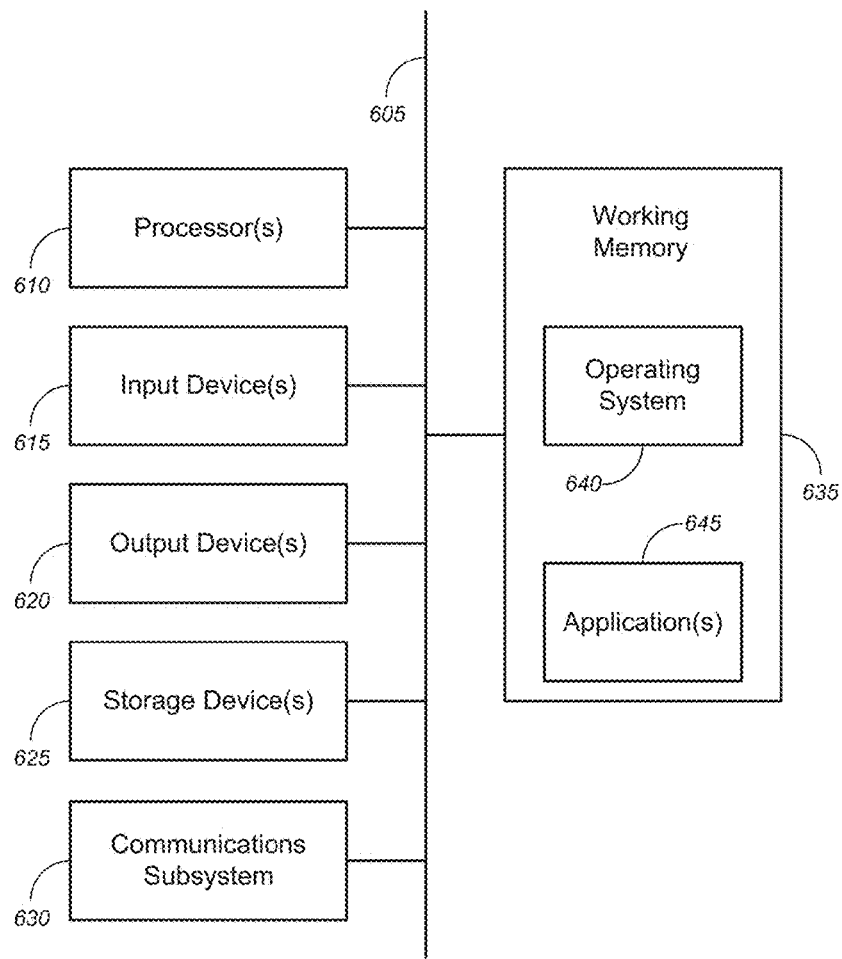
FIG. 6 is a schematic block diagram of a computer system for the machine discovery and rapid agglomeration of similar states, in accordance with various embodiments.

FIG. 6 is a schematic block diagram of a computer system 600 for the machine discovery and rapid agglomeration of similar states, in accordance with various embodiments. FIG. 6 provides a schematic illustration of one embodiment of a computer system 600, such as a DSS, collection node, or other central management and/or monitoring system, which may perform the methods provided by various other embodiments, as described herein. It should be noted that FIG. 6 only provides a generalized illustration of various components, of which one or more (or none) of each may be utilized as appropriate. FIG. 6, therefore, broadly illustrates how individual system elements may be implemented in a relatively separated or relatively more integrated manner.

The computer system 600—which represents an embodiment of the DSS as described above with respect to FIGS. 1-5—includes multiple hardware elements that may be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, GPUs, and/or the like); one or more input devices 615, which include, without limitation, a mouse, a keyboard, and/or the like; and one or more output devices 620, which can include, without limitation, a display device, and/or the like.

The computer system 600 may further include (and/or be in communication with) one or more storage devices 625, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 600 might also include a communications subsystem 630, which may include, without limitation, a modem, a network card (wireless or wired), an IR communication device, a wireless communication device and/or chip set (such as a Bluetooth™ device, an 802.11 device, a WiFi device, a WiMax device, a WWAN device, a Z-Wave device, a ZigBee device, cellular communication facilities, etc.), and/or the like. The communications subsystem 630 may permit data to be exchanged with a network (such as the network described below, to name one example), with other computer or hardware systems, between data centers or different cloud platforms, and/or with any other devices described herein. In many embodiments, the computer system 600 further comprises a working memory 635, which can include a RAM or ROM device, as described above.

The computer system 600 also may comprise software elements, shown as being currently located within the working memory 635, including an operating system 640, device drivers, executable libraries, and/or other code, such as one or more application programs 645, which may comprise computer programs provided by various embodiments (including, without limitation, control logic and other applications utilized by the DSS to perform the processes described above), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally receives the signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a storage device 625 either before or after execution by the processor(s) 610.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to certain structural and/or functional components for ease of description, methods provided by various embodiments are not limited to any single structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in sequentially for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a specific structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to one embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system comprising:
   a plurality of network devices associated with a cloud platform, each network device of the plurality of network devices configured to generate a respective data stream in real-time, each data stream including a sequence of data points indicative of a value of a performance metric at an associated time;
   a decision system in communication with the plurality of network devices, the decision system comprising:
      a processor;
      a non-transitory computer readable medium comprising instructions executable by the processor to:
         obtain, via the plurality of network devices, one or more data streams, each of the one or more data streams comprising real-time time-series data indicative of a network activity generated by a respective network device;
         determine a set of data streams of the one or more streams sharing at least one of a set of centroids associated with a data stream;
         generate a search vector of the data stream; and
         determine a match rate between the search vector a set of target vectors, wherein determining the match rate includes determining a number of times each target vector shares a centroid of the set of centroids with the search vector; and
         determine, based on the set of data streams, the occurrence of an incident.

2. The system of claim 1, wherein the instructions are further executable by the processor to:

define one or more buckets;
associate each of the one or more data streams with a respective bucket, based on respective identifying information of each of the one or more data streams;
separate each of the one or more data streams into a respective set of one or more data stream segments, each data stream segment associated with a respective time interval; and
determine a respective set of centroids for each bucket of the one or more buckets during a first time interval, based on all data segments in a respective bucket associated with the first time interval.

3. The system of claim 1, wherein the instructions are further executable by the processor to:
determine the set of centroids associated with the data stream;
determine a centroid associated with a data segment of the data stream at the first time interval;
identify a set of target vectors sharing the centroid of the data stream at the first time interval.

4. The system of claim 3, wherein the instructions are further executable by the processor to:
determine an anomaly has occurred on the data stream of the one or more data streams;
wherein the anomaly occurs during the first time interval.

5. The system of claim 1, wherein the instructions are further executable by the processor to:
remove, from the set of target vectors, any target vector with a match rate below a threshold value.

6. The system of claim 5, wherein the instructions are further executable by the processor to:
determine a set of neighboring vectors for each target vector of the set of target vectors, wherein the set of neighboring vectors includes neighboring vectors with a match rate above the threshold value for each respective target vector of the set of target vectors.

7. The system of claim 1, wherein the instructions are further executable by the processor to:
determine one or more connections of the data stream to one or more neighbors, and from the one or more neighbors to one or more neighbors of neighbors, wherein the one or more neighbors are data streams associated with the set of target vectors, and the one or more neighbors of neighbors are data streams associated with the set of neighboring vectors;
establish a threshold for the one or more connections based on at least one of the match rate, a correlation coefficient, or statistical significance;
generate a directed graph of the one or more connections satisfying the threshold;
determine strongly connected components within the directed graph based, at least in part, on a breadth-first search with a backtracking search phase; and
remove connections of the one or more connections that are not between strongly connected components.

8. The system of claim 1, wherein the instructions are further executable by the processor to:
determine a type of incident based on the set of data streams; and
perform a remedial action based on the type of incident.

9. The system of claim 1, wherein the instructions are further executable by the processor to:
receive analyst feedback indicative of whether the presence of the at least one of the set of centroids is associated with the incident; and
determine whether to associate the presence of the at least one of the set of centroids within the set of data streams with the incident, based on the analyst feedback.

10. An apparatus comprising:
a processor;
a non-transitory computer readable medium comprising instructions executable by the processor to:
obtain, via the plurality of network devices, one or more data streams, each of the one or more data streams comprising real-time time-series data indicative of a network activity generated by a respective network device;
determine a set of data streams of the one or more streams sharing at least one of a set of centroids associated with a data stream;
generate a search vector of the data stream;
determine a match rate between the search vector a set of target vectors, wherein determining the match rate includes determining a number of times each target vector shares a centroid of the set of centroids with the search vector; and
remove, from the set of target vectors, any target vector with a match rate below a threshold value; and
determine, based on the set of data streams, the occurrence of an incident.

11. The apparatus of claim 10, wherein the instructions are further executable by the processor to:
define one or more buckets;
associate each of the one or more data streams with a respective bucket, based on respective identifying information of each of the one or more data streams;
separate each of the one or more data streams into a respective set of one or more data stream segments, each data stream segment associated with a respective time interval; and
determine a respective set of centroids for each bucket of the one or more buckets during a first time interval, based on all data segments in a respective bucket associated with the first time interval.

12. The apparatus of claim 10, wherein the instructions are further executable by the processor to:
determine a centroid of the set of centroids associated with a first time interval;
identify a set of target vectors sharing the centroid of the data stream at the first time interval.

13. The apparatus of claim 12, wherein the instructions are further executable by the processor to:
determine an anomaly has occurred on the data stream of the one or more data streams;
wherein the anomaly occurs during the first time interval.

14. The apparatus of claim 13, wherein the instructions are further executable by the processor to:
determine one or more connections of the data stream to one or more neighbors, and from the one or more neighbors to one or more neighbors of neighbors, wherein the one or more neighbors are data streams associated with the set of target vectors, and the one or more neighbors of neighbors are data streams associated with the set of neighboring vectors;
establish a threshold for the one or more connections based on at least one of the match rate, a correlation coefficient, or statistical significance;
generate a directed graph of the one or more connections satisfying the threshold;
determine strongly connected components within the directed graph based, at least in part, on a breadth-first search with a backtracking search phase; and remove connections of the one or more connections that are not between strongly connected components.

15. A method comprising:

obtaining, via a decision support system, via the plurality of network devices, one or more data streams, each of the one or more data streams comprising real-time time-series data indicative of a network activity generated by a respective network device;

determining, via the decision support system, a set of data streams of the one or more streams sharing at least one of a set of centroids associated with the data stream;

generating, via the decision support system, a search vector of the data stream;

determining, via the decision support system, a match rate between the search vector a set of target vectors, wherein determining the match rate includes determining a number of times each target vector shares a centroid of the set of centroids with the search vector;

determining, via the decision support system, one or more connections of the data stream to one or more neighbors, and from the one or more neighbors to one or more neighbors of neighbors, wherein the one or more neighbors are data streams associated with the set of target vectors, and the one or more neighbors of neighbors are data streams associated with the set of neighboring vectors;

establishing, via the decision support system, a threshold for the one or more connections based on at least one of the match rate, a correlation coefficient, or statistical significance;

generating, via the decision support system, a directed graph of the one or more connections satisfying the threshold;

determining, via the decision support system, strongly connected components within the directed graph based, at least in part, on a breadth-first search with a backtracking search phase; and removing, via the decision support system, connections of the one or more connections that are not between strongly connected components;

determining, via the decision support system, based on the set of data streams, the occurrence of an incident; and performing, via the decision support system, a remedial action based on one of a type of the incident, the data stream, or the set of data streams.

16. The method of claim 15, further comprising:

defining, via the decision support system, one or more buckets;

associating, at the decision support system, each of the one or more data streams with a respective bucket, based on respective identifying information of each of the one or more data streams;

separating, via the decision support system, each of the one or more data streams into a respective set of one or more data stream segments, each data stream segment associated with a respective time interval; and determining, via the decision support system, a respective set of centroids for each bucket of the one or more buckets during a first time interval, based on all data segments in a respective bucket associated with the first time interval.

17. The method of claim 15, further comprising:

determining, via the decision support system, a centroid of the set of centroids associated with a first time interval;

identifying, via the decision support system, a set of target vectors sharing the centroid of the data stream at the first time interval.

* * * * *